United States Patent
Kuramoto et al.

(10) Patent No.: US 11,584,821 B2
(45) Date of Patent: Feb. 21, 2023

(54) RAW MATERIAL COMPOSITION FOR POLYISOCYANURATE AND METHOD FOR PRODUCING POLYISOCYANURATE

(71) Applicant: SHOWA DENKO K.K., Tokyo (JP)

(72) Inventors: Hiroki Kuramoto, Kawasaki (JP); Kenichi Nakanishi, Honjo (JP); Shohei Nishizawa, Ichihara (JP); Yoshishige Okuno, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/266,847

(22) PCT Filed: Jul. 11, 2019

(86) PCT No.: PCT/JP2019/027532
§ 371 (c)(1),
(2) Date: Feb. 8, 2021

(87) PCT Pub. No.: WO2020/036023
PCT Pub. Date: Feb. 20, 2020

(65) Prior Publication Data
US 2021/0292462 A1 Sep. 23, 2021

(30) Foreign Application Priority Data

Aug. 13, 2018 (JP) .............................. JP2018-152261
Feb. 4, 2019 (JP) .............................. JP2019-018223

(51) Int. Cl.
| | |
|---|---|
| C08G 18/00 | (2006.01) |
| C07F 9/50 | (2006.01) |
| C09J 175/02 | (2006.01) |
| C08G 18/79 | (2006.01) |
| C08K 5/50 | (2006.01) |
| C08G 59/40 | (2006.01) |
| C08G 18/76 | (2006.01) |
| C08G 18/72 | (2006.01) |
| C09J 163/00 | (2006.01) |
| C08G 18/73 | (2006.01) |
| C08G 18/18 | (2006.01) |
| C08G 18/16 | (2006.01) |
| C08G 18/75 | (2006.01) |
| C08G 18/02 | (2006.01) |
| C08K 5/5397 | (2006.01) |

(52) U.S. Cl.
CPC .......... *C08G 18/003* (2013.01); *C07F 9/5022* (2013.01); *C08G 18/02* (2013.01); *C08G 18/168* (2013.01); *C08G 18/1883* (2013.01); *C08G 18/724* (2013.01); *C08G 18/725* (2013.01); *C08G 18/73* (2013.01); *C08G 18/757* (2013.01); *C08G 18/7621* (2013.01); *C08G 18/7671* (2013.01); *C08G 18/792* (2013.01); *C08G 59/4028* (2013.01); *C08K 5/50* (2013.01); *C08K 5/5397* (2013.01); *C09J 163/00* (2013.01); *C09J 175/02* (2013.01)

(58) Field of Classification Search
CPC .. C08G 18/003; C08G 18/724; C08G 18/725; C08G 18/73; C08G 18/1883; C08G 18/02; C08G 18/168; C08G 18/757; C08G 18/7621; C08G 18/7671; C08G 18/792; C08G 59/4028; C07F 9/5022; C09J 175/02; C09J 163/00; C08K 5/50; C08K 5/5397
See application file for complete search history.

(56) References Cited

U.S. PATENT DOCUMENTS

2009/0131556 A1* 5/2009 Honda ................... C08J 5/24
264/328.8

FOREIGN PATENT DOCUMENTS

| CN | 102731814 A | 10/2012 |
|---|---|---|
| CN | 107683297 A | 2/2018 |

(Continued)

OTHER PUBLICATIONS

International Search Report for PCT/JP2019/027532 dated Oct. 15, 2019 [PCT/ISA/210].

(Continued)

*Primary Examiner* — Rabon A Sergent
(74) *Attorney, Agent, or Firm* — Sughrue Mion, PLLC

(57) ABSTRACT

A polyisocyanurate raw material composition containing a polyfunctional isocyanate, a compound (I) represented by general formula (I) shown below, and an epoxy compound. In general formula (I), each of $R^1$ to $R^5$ represents a hydrogen atom, an alkoxy group of 1 to 10 carbon atoms, an alkyl group of 2 to 10 carbon atoms (or an alkyl group of 1 to 10 carbon atoms in the case of $R^3$ to $R^5$), an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom (provide that $R^1$ and $R^2$ are not both hydrogen atoms).

[Chemical formula 1]

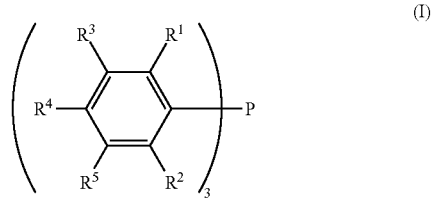

17 Claims, 1 Drawing Sheet

(56) References Cited

FOREIGN PATENT DOCUMENTS

| | | |
|---|---|---|
| CN | 108350147 A | 7/2018 |
| JP | 03-095213 A | 4/1991 |
| JP | 2002-97182 A | 4/2002 |
| JP | 2016-169362 A | 9/2016 |
| WO | 2017/077928 A1 | 5/2017 |

OTHER PUBLICATIONS

"Coatings Technology & Abstracts", Radiation Curing Coatings, Issue 06, Jun. 30, 2010, pp. 44-46 (3 pages total).
Office Action dated Mar. 31, 2022 in Chinese Application No. 201980052835.2.

\* cited by examiner

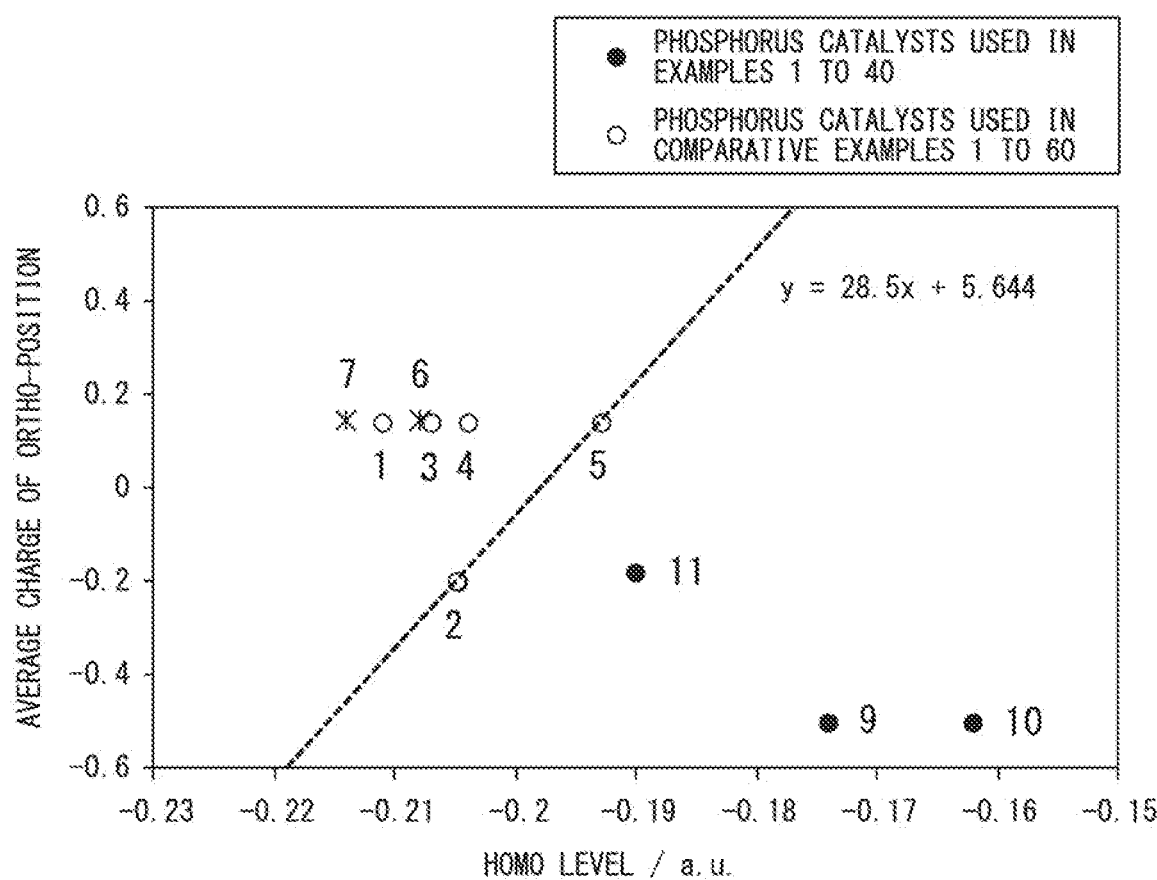

RAW MATERIAL COMPOSITION FOR POLYISOCYANURATE AND METHOD FOR PRODUCING POLYISOCYANURATE

CROSS REFERENCE TO RELATED APPLICATIONS

This application is a National Stage of International Application No. PCT/JP2019/027532 filed Jul. 11, 2019, claiming priority based on Japanese Patent Application No. 2018-152261 filed Aug. 13, 2018 and Japanese Patent Application No. 2019-018223 filed Feb. 4, 2019.

TECHNICAL FIELD

The present invention relates to a polyisocyanurate raw material composition and a method for producing a polyisocyanurate. Further, the present invention also relates to polyisocyanurate production kit, a polyisocyanurate raw material cured product, a catalyst for a polyisocyanurate production reaction, and an adhesive that uses the polyisocyanurate raw material composition.

Priority is claimed on Japanese Patent Application No. 2018-152261, filed Aug. 13, 2018, and Japanese Patent Application No. 2019-018223, filed Feb. 4, 2019, the contents of which are incorporated herein by reference.

BACKGROUND ART

Polyisocyanurates are resins in which isocyanurate rings are linked in an arbitrary manner. It is said that by introducing isocyanurate ring structures into a polyurethane foam, the heat resistance and flame retardancy can be improved, but little progress has been made on industrial uses of polyisocyanurates themselves.

Polyisocyanurates are synthesized by a trimerization reaction of a polyfunctional isocyanate. Conventionally, tertiary amines, quaternary ammonium salts, and metal salts and the like have been used as the catalyst for the isocyanate trimerization reaction (for example, see Patent Document 1).

PRIOR ART LITERATURE

Patent Document

Patent Document 1: Japanese Unexamined Patent Application, First Publication No. Hei 03-95213

SUMMARY OF INVENTION

Problems to be Solved by the Invention

However, catalysts such as tertiary amines, quaternary ammonium salts, and metal salts and the like exhibit high hygroscopicity, and can therefore cause foaming during heat curing.

On the other hand, examples of catalysts having low hygroscopicity include phosphorus catalysts and the like. However, with phosphorus catalysts, the reaction efficiency of the polyfunctional isocyanate trimerization reaction is low, meaning a satisfactory amount of the isocyanurate ring cannot be produced upon heat curing.

The present invention has been developed in light of the above circumstances, and has an object of providing a method for producing a polyisocyanurate that exhibits little foaming during heat curing and has favorable curability, as well as a polyisocyanurate raw material composition, a polyisocyanurate production kit and a polyisocyanurate production reaction catalyst that can be used in the production method. Further, the invention also has an object of providing a polyisocyanurate having little foaming produced by the above production method, namely a polyisocyanurate raw material cured product. Moreover, the invention also has an object of providing an adhesive that uses the polyisocyanurate raw material composition.

Means for Solving the Problems

The present invention includes the following aspects.
[1] A polyisocyanurate raw material composition containing a polyfunctional isocyanate, a compound (I) represented by general formula (I) shown below, and an epoxy compound.

[Chemical formula 1]

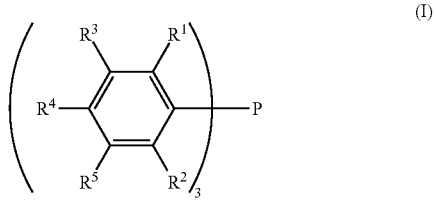

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]
[2] A polyisocyanurate raw material composition containing a polyfunctional isocyanate, and a compound (I) represented by general formula (I) shown below.

[Chemical formula 2]

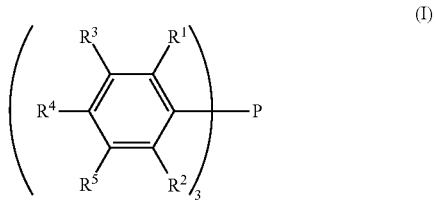

[In general formula (I), each of $R^1$ and $R^2$ independently represents a hydrogen atom, an alkoxy group of 1 to 12 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of R³ to R⁵ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of R¹ to R⁵ may be the same or different.]

[3] The polyisocyanurate raw material composition according to [1] or [2], wherein the ratio (molar ratio) between the polyfunctional isocyanate and the compound (I) is represented by: polyfunctional isocyanate/compound (I)=100/0.001 to 100/5.

[4] The polyisocyanurate raw material composition according to any one of [1] to [3], wherein the polyfunctional isocyanate is at least one compound selected from the group consisting of diphenylmethane diisocyanate, tolylene diisocyanate, hexamethylene diisocyanate, bis(isocyanatomethyl)cyclohexane, and modified polyisocyanates thereof.

[5] The polyisocyanurate raw material composition according to any one of [1] to [4], wherein each of R¹ and R² in general formula (I) independently represents a hydrogen atom, an alkoxy group of 1 to 4 carbon atoms, a monoalkylamino group of 1 to 4 carbon atoms, or a dialkylamino group of 2 to 8 carbon atoms (provided that R¹ and R² are not both hydrogen atoms).

[6] A polyisocyanurate production kit containing: (a) a polyfunctional isocyanate, (b) a compound represented by general formula (I) shown below, and (c) an epoxy compound, wherein the components (a) to (c) are each housed in a different container.

[Chemical formula 3]

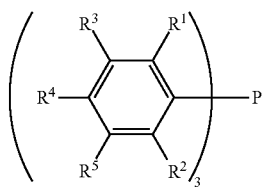

(I)

[In general formula (I), each of R¹ and R² independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, R¹ and R² may not both be hydrogen atoms. Each of R³ to R⁵ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of R¹ to R⁵ may be the same or different.]

[7] A polyisocyanurate production kit containing: (d) a composition containing a polyfunctional isocyanate and a compound (I) represented by general formula (I) shown below, and (c) an epoxy compound, wherein the components (d) and (c) are each housed in a different container.

[Chemical formula 4]

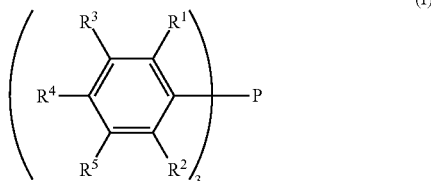

(I)

[In general formula (I), each of R¹ and R² independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, R¹ and R² may not both be hydrogen atoms. Each of R³ to R⁵ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of R¹ to R⁵ may be the same or different.]

[8] The polyisocyanurate production kit according to [7], wherein the ratio (molar ratio) between the polyfunctional isocyanate and the compound (I) in the composition (d) is represented by: polyfunctional isocyanate/compound (I)=100/0.001 to 100/5.

[9] A polyisocyanurate production kit containing: (d) a composition containing a polyfunctional isocyanate and a compound (I) represented by general formula (I) shown below, and (e) a composition containing a polyfunctional isocyanate and an epoxy compound, wherein the components (d) and (e) are each housed in a different container.

[Chemical formula 5]

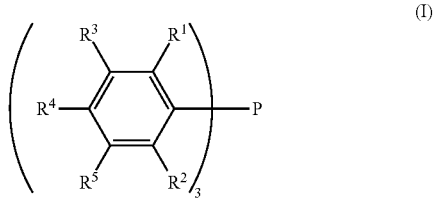

(I)

[In general formula (I), each of R¹ and R² independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, R¹ and R² may not both be hydrogen atoms. Each of R³ to R⁵ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

[10] A polyisocyanurate production kit containing: (e) a composition containing a polyfunctional isocyanate and an epoxy compound, and (b) a compound (I) represented by general formula (I) shown below, wherein the components (e) and (b) are each housed in a different container.

[Chemical formula 6]

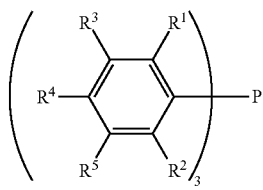

(I)

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

[11] The polyisocyanurate production kit according to any one of [6] to [10], wherein the polyfunctional isocyanate is at least one compound selected from the group consisting of diphenylmethane diisocyanate, tolylene diisocyanate, hexamethylene diisocyanate, bis(isocyanatomethyl)cyclohexane, and modified polyisocyanates thereof.

[12] The polyisocyanurate production kit according to any one of [6] to [11], wherein each of $R^1$ and $R^2$ in general formula (I) independently represents a hydrogen atom, an alkoxy group of 1 to 4 carbon atoms, a monoalkylamino group of 1 to 4 carbon atoms, or a dialkylamino group of 2 to 8 carbon atoms (provided that $R^1$ and $R^2$ are not both hydrogen atoms).

[13] A polyisocyanurate raw material cured product obtained by heating the polyisocyanurate raw material composition according to any one of [1] to [5].

[14] A polyisocyanurate raw material cured product containing:

a polyisocyanurate, and at least one compound selected from the group consisting of a compound (I) represented by general formula (I) shown below and a compound (I') represented by general formula (I') shown below.

[Chemical formula 7]

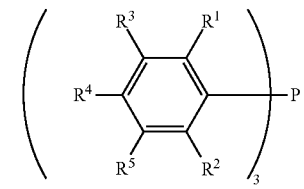

(I)

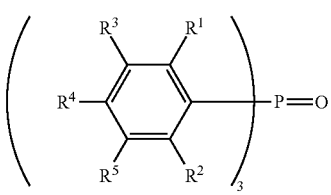

(I')

[In general formulas (I) and (I'), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

[15] The polyisocyanurate raw material cured product according to [14], also containing at least one compound selected from the group consisting of (i) an epoxy compound, (ii) a reaction product of an epoxy compound and a polyfunctional isocyanate, (iii) a reaction product of an epoxy compound and the compound (I), and (iv) a reaction product of an epoxy compound and an epoxy compound.

[16] The polyisocyanurate raw material cured product according to [14] or [15], wherein each of $R^1$ and $R^2$ in general formulas (I) and (I') independently represents a hydrogen atom, an alkoxy group of 1 to 4 carbon atoms, a monoalkylamino group of 1 to 4 carbon atoms, or a dialkylamino group of 2 to 8 carbon atoms (provided that $R^1$ and $R^2$ are not both hydrogen atoms).

[17] A method for producing a polyisocyanurate, including a mixing step of mixing a polyfunctional isocyanate, a compound (I) represented by general formula (I) shown below and an epoxy compound, and a heating step of heating the mixture obtained in the mixing step.

[Chemical formula 8]

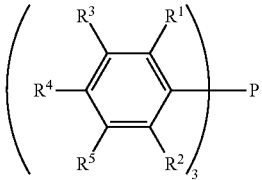

(I)

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

[18] The method for producing a polyisocyanurate according to [17], wherein the mixing step is a step of mixing the epoxy compound into a mixture (d) of the polyfunctional isocyanate and the compound (I).

[19] The method for producing a polyisocyanurate according to [17], wherein the mixing step is a step of mixing the compound (I) into a mixture (e) of the polyfunctional isocyanate and the epoxy compound.

[20] The method for producing a polyisocyanurate according to [17], wherein the mixing step is a step of mixing a mixture (e) of the polyfunctional isocyanate and the epoxy compound into a mixture (d) of the polyfunctional isocyanate and the compound (I).

[21] The method for producing a polyisocyanurate according to any one of [17] to [20], wherein the mixing ratio (molar ratio) between the polyfunctional isocyanate and the compound (I) is represented by: polyfunctional isocyanate/compound (I)=100/0.001 to 100/5.

[22] The method for producing a polyisocyanurate according to any one of [17] to [21], wherein the polyfunctional isocyanate is at least one compound selected from the group consisting of diphenylmethane diisocyanate, tolylene diisocyanate, hexamethylene diisocyanate, bis(isocyanatomethyl)cyclohexane, and modified polyisocyanates thereof.

[23] The method for producing a polyisocyanurate according to any one of [17] to [22], wherein each of $R^1$ and $R^2$ in general formula (I) independently represents a hydrogen atom, an alkoxy group of 1 to 4 carbon atoms, a monoalkylamino group of 1 to 4 carbon atoms, or a dialkylamino group of 2 to 8 carbon atoms (provided that $R^1$ and $R^2$ are not both hydrogen atoms).

[24] The method for producing a polyisocyanurate according to any one of [17] to [23], wherein the heating step is conducted at a temperature of 40 to 240° C.

[25] The method for producing a polyisocyanurate according to [24], wherein the heating step is a step of conducting heating at 60 to 120° C. for 1 to 180 minutes, and then conducting heating at 120 to 240° C. for 1 to 180 minutes.

[26] A polyisocyanurate production reaction catalyst containing a combination of a compound (I) represented by general formula (I) shown below and an epoxy compound.

[Chemical formula 9]

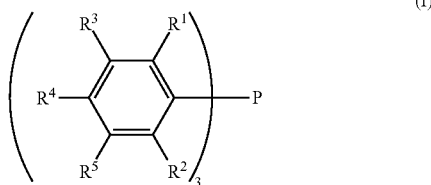

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

[27] A polyisocyanurate production kit, containing a combination of a compound (I) represented by general formula (I) shown below and an epoxy compound as a polyisocyanurate production reaction catalyst.

[Chemical formula 10]

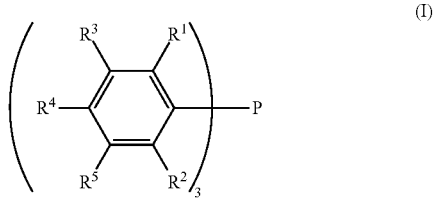

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

[28] An adhesive formed from the polyisocyanurate raw material composition according to any one of [1] to [5].

Effects of the Invention

The present invention provides a method for producing a polyisocyanurate that exhibits little foaming during heat curing and has favorable curability, as well as a polyisocyanurate raw material composition, a polyisocyanurate production kit and a polyisocyanurate production reaction catalyst that can be used in the production method. Further, the invention also provides a polyisocyanurate having little foaming produced by the above production method, namely a polyisocyanurate raw material cured product. Moreover, the invention also provides an adhesive that uses the polyisocyanurate raw material composition.

BRIEF DESCRIPTION OF THE DRAWINGS

FIG. 1 is a scatter diagram illustrating the relationship between the HOMO level and the average charge of the ortho position for the compounds listed in Table 14.

EMBODIMENTS FOR CARRYING OUT THE INVENTION

Embodiments of the present invention are described below in detail. However, the present invention is not limited by the embodiments described below.

In this description, a "polyisocyanurate" refers to a compound having a structure in which a plurality of isocyanurate rings are linked arbitrarily via divalent organic groups.

In this description, a "polyisocyanurate raw material composition" refers to a composition containing either the raw materials for a polyisocyanurate (the reactants for a polyisocyanurate production reaction) and/or a catalyst for a polyisocyanurate production reaction, and describes a composition used in the production of a polyisocyanurate or a polyisocyanurate raw material cured product.

In this description, a "polyisocyanurate production kit" refers to a kit containing the raw materials for a polyisocyanurate and a polyisocyanurate production reaction catalyst, and describes a kit used in the production of a polyisocyanurate or a polyisocyanurate raw material cured product.

In this description, a "polyisocyanurate raw material cured product" refers to a cured product containing a polyisocyanurate, obtained by heating a polyisocyanurate raw material composition.

In this description, when reference is made to the number of carbon atoms of an alkyl group, alkoxy group, fluoroalkyl group or aryl group, the disclosed number of carbon atoms does not include any carbon atoms in substituents.

Polyisocyanurate Raw Material Composition

First Embodiment

In one embodiment, the present invention provides a polyisocyanurate raw material composition containing a polyfunctional isocyanate, a compound represented by general formula (I) shown below (hereafter also referred to as "the compound (I)"), and an epoxy compound.

[Chemical formula 11]

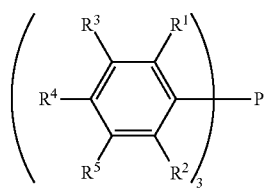

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

(Polyfunctional Isocyanate)

A "polyfunctional isocyanate" means a compound containing two or more isocyanato groups (—N═C═O). The polyfunctional isocyanate may use any of the compounds typically used in the production of polyisocyanurates without any particular limitations. Although there are no particular limitations on the number of isocyanato groups contained within the polyfunctional isocyanate, provided the number is at least 2, a number from 2 to 5 is preferred, 2 or 3 is more preferred, and 2 is the most desirable. Examples of the polyfunctional isocyanate include aliphatic isocyanates and aromatic isocyanates.

An aliphatic isocyanate is a polyfunctional isocyanate containing an aliphatic hydrocarbon group and two or more isocyanato groups. The aliphatic hydrocarbon group may be a linear or branched aliphatic hydrocarbon group, or may be an aliphatic hydrocarbon group containing a ring within the structure. Examples of aliphatic hydrocarbon groups containing a ring within the structure include alicyclic groups, groups in which an alicyclic group is bonded to the terminal of a linear or branched aliphatic hydrocarbon group, and groups in which an alicyclic group is included within the chain of a linear or branched aliphatic hydrocarbon group. The aliphatic hydrocarbon group preferably contains 1 to 15 carbon atoms, more preferably 3 to 10 carbon atoms, and even more preferably 5 to 10 carbon atoms.

An aromatic isocyanate is a polyfunctional isocyanate containing at least one aromatic ring and two or more isocyanato groups. There are no particular limitations on the aromatic ring, provided it is a cyclic conjugated system having (4n+2) π-electrons, and the aromatic ring may be monocyclic or polycyclic. The aromatic ring may be an aromatic hydrocarbon ring or an aromatic heterocyclic ring. The aromatic ring preferably contains 6 to 15 carbon atoms, and more preferably 6 to 12 carbon atoms. The number of aromatic rings in the aromatic isocyanate is preferably from 1 to 5, more preferably from 1 to 3, and particularly preferably 1 or 2. The aromatic isocyanate may also contain an aliphatic hydrocarbon group in addition to the aromatic ring and the isocyanato groups. Examples of the aliphatic hydrocarbon group includes the same groups as those exemplified for the aliphatic hydrocarbon group in the aliphatic isocyanate.

Specific examples of the aliphatic isocyanate include, but are not limited to, tetramethylene-1,4-diisocyanate, pentamethylene-1,5-diisocyanate, hexamethylene-1,6-diisocyanate, octamethylene-1,8-diisocyanate, dodecamethylene-1,12-diisocyanate, 2,2,4-trimethylhexamethylene-1,6-diisocyanate, 2,4,4-trimethylhexamethylene-1,6-diisocyanate, 1-isocyanato-3,3,5-trimethyl-5-isocyanatomethylcyclohexane, cis-cyclohexane-1,4-diisocyanate, 1-isocyanato-3,3,5-trimethyl-5-isocyanatomethylcyclohexane, trans-cyclohexane-1,4-diisocyanate, dicyclohexylmethane-4,4'-diisocyanate, ω,ω-diisocyanatomethyl-1,4-cyclohexane, ω,ω-diisocyanatomethyl-1,3-cyclohexane, 3,10-diisocyanatotricyclo[5.2.1.0$^{2,6}$]decane, 2,2-bis(4-isocyanatocyclohexyl)propane, 6,8-diisocyanatobicyclo[3.3.0]octane, undecane-1,6,10-triisocyanate, lysine diisocyanate methyl ester, and N,N'-bis(ω-isocyanatopropyl)oxazinetrione.

Specific examples of the aromatic isocyanate include, but are not limited to, tolylene-2,4-diisocyanate, tolylene-2,6-diisocyanate, diphenylmethane-2,4'-diisocyanate, diphenylmethane-4,4'-diisocyanate, naphthalene-1,5-diisocyanate, tolylene diisocyanate, bitolylene diisocyanate, anisidine diisocyanate, 3,3'-dimethylbiphenyl-4,4'-diisocyanate, diphenyl ether-4,4'-diisocyanate, triphenylmethane-4,4',4"-triisocyanate, tris(4-isocyanatophenyl) thiophosphate, xylylene-1,3-diisocyanate, and xylylene-1,4-diisocyanate.

Further, the polyfunctional isocyanate may also be a polyphenyl polymethylene polyisocyanate of the type obtained by condensing aniline with formalin and then conducting a phosgenation, a diphenylmethane diisocyanate containing a carbodiimide group or uretonimine group that is liquid at normal temperature, such as those disclosed in German Patent Publication No. 1092007, or a modified polyisocyanate containing a urethane linkage, allophanate linkage, isocyanurate cyclic structure, urea linkage, biuret linkage, or uretdione cyclic structure or the like.

Furthermore, the polyfunctional isocyanate may also be an isocyanate-based prepolymer obtained by reacting an excess of the type of isocyanate described above with a polyol used in the urethane industry.

Among the various possibilities, the polyfunctional isocyanate is preferably diphenylmethane diisocyanate, tolylene diisocyanate, hexamethylene diisocyanate, bis(isocyanatomethyl)cyclohexane, or a modified polyisocyanate of one of these compounds.

A commercially available product may also be used as the polyfunctional isocyanate. Examples of commercially available polyfunctional isocyanates include Millionate (a registered trademark) MT (Tosoh Corporation), Coronate (a registered trademark) T-65 (Tosoh Corporation), Coronate (a registered trademark) T-80 (Tosoh Corporation), Coronate (a registered trademark) T-100 (Tosoh Corporation), HDI (Tosoh Corporation), Duranate (a registered trademark) 50M (Asahi Kasei Chemicals Corporation), Takenate (a registered trademark) 600 (Mitsui Chemicals, Inc.), Coronate (a registered trademark) HX (Tosoh Corporation), Duranate (a registered trademark) TPA-100 (Asahi Kasei Chemicals Corporation), Duranate (a registered trademark) 24A-100 (Asahi Kasei Chemicals Corporation), and Duranate (a registered trademark) D201 (Asahi Kasei Chemicals Corporation).

Further, the polyfunctional isocyanate may be a compound in which the isocyanato groups are blocked. The expression that "the isocyanato groups are blocked" means that the isocyanato groups are protected with a protective group. A blocked isocyanato group can be represented by general formula —N—C(=O)—B (wherein B is a protective group). Any group typically used as a protective group for an isocyanato group may be used without any particular limitations as the protective group. By using a polyfunctional isocyanate in which the isocyanato groups are blocked (hereafter sometimes referred to as a "blocked polyfunctional isocyanate"), unintended trimerization reactions can be prevented.

A single polyfunctional isocyanate may be used alone, or a combination of two or more polyfunctional isocyanates may be used.

The proportion of the polyfunctional isocyanate in the polyisocyanurate raw material composition of the present embodiment is, for example, typically at least 80 mol % but less than 100 mol %. The proportion of the polyfunctional isocyanate in the polyisocyanurate raw material composition is preferably at least 85 mol % but not more than 99.99 mol %, more preferably at least 90 mol % but not more than 98 mol %, and even more preferably at least 93 mol % but not more than 97 mol %. Provided the proportion of the polyfunctional isocyanate is at least as large as the lower limit of the above range, favorable heat resistance can be achieved. Further, provided the proportion of the polyfunctional isocyanate is not more than the upper limit of the above range, a balance with the other components can be more easily achieved.

(Compound (I))

The compound (I) is a compound represented by general formula (I) shown below.

[Chemical formula 12]

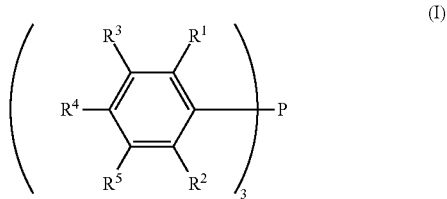

[In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

In general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms.

The alkoxy group of 1 to 10 carbon atoms for $R^1$ and $R^2$ preferably has 1 to 4 carbon atoms, more preferably 1 to 3 carbon atoms, and even more preferably 1 or 2 carbon atoms.

The alkoxy group is a group represented by —OR (wherein R is an alkyl group). The alkyl group represented by R may be linear or branched, and may include a ring within the structure, but is preferably a linear or branched alkyl group. Examples of the alkyl group include a methyl group, and the same groups as the alkyl groups of 2 to 10 carbon atoms exemplified below.

Specific examples of the alkoxy group of 1 to 10 carbon atoms include a methoxy group, ethoxy group, n-propoxy group, iso-propoxy group, n-butoxy group, and tert-butoxy group. Among these, a methoxy group or ethoxy group is preferred, and a methoxy group is more preferred.

The alkyl group of 2 to 10 carbon atoms for $R^1$ and $R^2$ may be linear or branched, and may include a ring within the structure. The alkyl group of 2 to 10 carbon atoms for $R^1$ and $R^2$ preferably has 2 to 5 carbon atoms, and more preferably 2 or 3 carbon atoms.

Examples of the linear or branched alkyl group include an ethyl group, propyl group, isopropyl group, n-butyl group, sec-butyl group, isobutyl group, tert-butyl group, n-pentyl group, neopentyl group, isopentyl group and sec-pentyl group.

The linear or branched alkyl group for $R^1$ and $R^2$ may have a substituent. In this description, the expression "may have a substituent" means that a hydrogen atom (—H) of the hydrocarbon group may be substituted with a monovalent group. Examples of the substituent include an amino group, carboxy group, cyano group, and halogen atoms. Examples of halogen atoms for the substituent include a fluorine atom, chlorine atom, bromine atom and iodine atom.

The linear or branched alkyl group for $R^1$ and $R^2$ is more preferably a group having no substituent.

Examples of alkyl groups including a ring within the structure include a cyclohexyl group, groups in which a cycloalkane ring is bonded to the terminal of a linear or branched alkyl group, and groups in which a cycloalkane ring is included within the chain of a linear or branched alkyl group. The cycloalkane ring may be monocyclic or polycyclic, but is preferably monocyclic. Examples of alkyl groups that include a ring within the structure include a cyclopropyl group, cyclobutyl group, cyclopentyl group, cyclohexyl group, and groups in which a linear or branched alkyl group is bonded to one of these cycloalkyl groups.

The alkyl group including a ring within the structure for $R^1$ and $R^2$ may have a substituent. Examples of the substituent include an amino group, carboxy group, cyano group, and halogen atoms.

The aryl group of 6 to 12 carbon atoms for $R^1$ and $R^2$ preferably has 6 to 10 carbon atoms. Specific examples of the aryl group include a phenyl group, tolyl group, o-xylyl group, naphthyl group and biphenyl group.

The aryl group of 6 to 12 carbon atoms for $R^1$ and $R^2$ may have a substituent. Examples of the substituent include alkyl groups of 1 to 5 carbon atoms, an amino group, carboxy group, cyano group, and halogen atoms.

The fluoroalkyl group of 1 to 10 carbon atoms for $R^1$ and $R^2$ preferably has 1 to 5 carbon atoms, more preferably 1 to 3 carbon atoms, and even more preferably 1 or 2 carbon atoms. Specific examples of the fluoroalkyl group of 1 to 10 carbon atoms for $R^1$ and $R^2$ include a monofluoromethyl group, difluoromethyl group, trifluoromethyl group, and groups in which some or all of the hydrogen atoms of an alkyl group exemplified above for the alkyl group of 2 to 10 carbon atoms have each been substituted with a fluorine atom.

Examples of the halogen atom for $R^1$ and $R^2$ include a fluorine atom, chlorine atom, bromine atom and iodine atom. Among these, the halogen atom for $R^1$ and $R^2$ is preferably a fluorine atom.

Each of the alkyl groups in either the monoalkylamino group of 1 to 10 carbon atoms or the dialkylamino group of 2 to 20 carbon atoms for $R^1$ and $R^2$ preferably has 1 to 10 carbon atoms, more preferably 1 to 5 carbon atoms, even more preferably 1 to 3 carbon atoms, and still more preferably 1 or 2 carbon atoms. The alkyl group may be linear or branched, and may include a ring within the structure. Specific examples of the monoalkylamino group of 1 to 10 carbon atoms or the dialkylamino group of 2 to 20 carbon atoms for $R^1$ and $R^2$ include a methylamino group, dimethylamino group, and groups in which one or two of the hydrogen atoms in an amino group have each been substituted with an alkyl group exemplified above for the alkyl group of 2 to 10 carbon atoms.

Among the various possibilities described above, from the viewpoint of reactivity, $R^1$ and $R^2$ are preferably electron-donating groups. It is preferable that at least one of $R^1$ and $R^2$ is an electron-donating group, and more preferable that both $R^1$ and $R^2$ are electron-donating groups. Specific examples of electron-donating groups include alkoxy groups and amino groups. More specifically, each of $R^1$ and $R^2$ preferably independently represents an alkoxy group of 1 to 10 carbon atoms, an amino group, a monoalkylamino group of 1 to 10 carbon atoms, a dialkylamino group of 2 to 20 carbon atoms, or a hydrogen atom, is more preferably an alkoxy group of 1 to 10 carbon atoms, a monoalkylamino group of 1 to 10 carbon atoms, a dialkylamino group of 2 to 20 carbon atoms, or a hydrogen atom, and is even more preferably an alkoxy group of 1 to 4 carbon atoms, a monoalkylamino group of 1 to 4 carbon atoms, a dialkylamino group of 2 to 8 carbon atoms, or a hydrogen atom. Among these, an ethoxy group, methoxy group, methylamino group, dimethylamino group, or hydrogen atom is preferred for $R^1$ and $R^2$, and a hydrogen atom, methylamino group, dimethylamino group or methoxy group is particularly desirable. However, in the above description, $R^1$ and $R^2$ may not both be hydrogen atoms. Examples of preferred combinations for $R^1$ and $R^2$ include combinations of two electron-donating groups, and combinations of an electron-donating group and a hydrogen atom.

In general formula (I), the three of each of $R^1$ and $R^2$ may be the same or different. The three $R^1$ moieties may all be mutually different, two of the three may be the same and one different, or all three may be the same, and it is preferable that all three $R^1$ moieties are the same. The three $R^2$ moieties may all be mutually different, two of the three may be the same and one different, or all three may be the same, and it is preferable that all three $R^2$ moieties are the same.

In general formula (I), each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom.

The alkyl group of 1 to 10 carbon atoms for $R^3$ to $R^5$ preferably has 1 to 5 carbon atoms, more preferably 1 to 3 carbon atoms, and even more preferably 1 or 2 carbon atoms. Examples of the alkyl group of 1 to 10 carbon atoms for $R^3$ to $R^5$ include a methyl group, and the same groups as those exemplified above for the alkyl group of 2 to 10 carbon atoms for $R^1$ and $R^2$.

The alkoxy group of 1 to 10 carbon atoms for $R^3$ to $R^5$ preferably has 1 to 4 carbon atoms, more preferably 1 to 3 carbon atoms, and even more preferably 1 or 2 carbon atoms.

Specific examples of the alkoxy group of 1 to 10 carbon atoms include the same groups as those exemplified above for the alkoxy group of 1 to 10 carbon atoms for $R^1$ and $R^2$. Among these, the alkoxy group of 1 to 10 carbon atoms for $R^3$ to $R^5$ is preferably a methoxy group or an ethoxy group, and is more preferably a methoxy group.

Examples of the aryl group of 6 to 12 carbon atoms, the fluoroalkyl group of 1 to 10 carbon atoms, the monoalkylamino group of 1 to 10 carbon atoms, the dialkylamino group of 2 to 20 carbon atoms, and the halogen atom for $R^3$ to $R^5$ include the same groups and atoms as those exemplified above for the aryl group of 6 to 12 carbon atoms, the fluoroalkyl group of 1 to 10 carbon atoms, the monoalkylamino group of 1 to 10 carbon atoms, the dialkylamino group of 2 to 20 carbon atoms, and the halogen atom for $R^1$ and $R^2$.

Among the various possibilities, from the viewpoint of reactivity, each of $R^3$ to $R^5$ is preferably a hydrogen atom or an electron-donating group. More specifically, each of $R^3$ to $R^5$ is preferably a hydrogen atom, alkoxy group, amino group, monoalkylamino group or dialkylamino group, and is more preferably a hydrogen atom, alkoxy group, monoalkylamino group or dialkylamino group.

In the above general formula (I), the three of each of $R^3$ to $R^5$ may be the same or different. The three $R^3$ moieties may all be mutually different, two of the three may be the same and one different, or all three may be the same, and it is preferable that all three $R^3$ moieties are the same. The three $R^4$ moieties may all be mutually different, two of the three may be the same and one different, or all three may be the same, and it is preferable that all three $R^4$ moieties are the same. The three $R^5$ moieties may all be mutually different, two of the three may be the same and one different, or all three may be the same, and it is preferable that all three $R^5$ moieties are the same.

Preferred examples of the compound (I) represented by the above general formula (I) include compounds represented by general formula (I-1) shown below.

[Chemical formula 13]

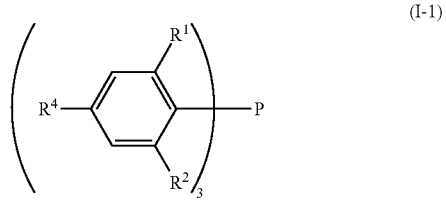

(I-1)

[In the formula, $R^1$, $R^2$ and $R^4$ are the same as $R^1$, $R^2$ and $R^4$ in the above general formula (I). The three of each of $R^1$, $R^2$ and $R^4$ may be the same or different.]

Examples of $R^1$ and $R^2$ in general formula (I-1) include the same groups and atoms as those exemplified above for $R^1$ and $R^2$ in general formula (I).

Among the various possibilities, each of $R^1$ and $R^2$ is preferably an alkoxy group of 1 to 10 carbon atoms, a monoalkylamino group of 1 to 10 carbon atoms or a dialkylamino group of 2 to 20 carbon atoms. The alkoxy group of 1 to 10 carbon atoms preferably has 1 to 4 carbon atoms and more preferably 1 to 3 carbon atoms, and is even more preferably an ethoxy group or a methoxy group, with a methoxy group being particularly desirable. Each of the alkyl groups in the monoalkylamino group of 1 to 10 carbon atoms or the dialkylamino group of 2 to 20 carbon atoms is preferably an alkyl group of 1 to 4 carbon atoms, and more preferably an alkyl group of 1 to 3 carbon atoms, and a methylamino group or dimethylamino group is particularly desirable.

In general formula (I-1), examples of $R^4$ include the same atoms and groups as those exemplified for $R^4$ in general formula (I).

Among these, $R^4$ is preferably a hydrogen atom or an alkoxy group of 1 to 10 carbon atoms. The alkoxy group of 1 to 10 carbon atoms preferably has 1 to 4 carbon atoms and more preferably 1 to 3 carbon atoms, and is even more preferably an ethoxy group or a methoxy group, with a methoxy group being particularly desirable.

Preferred specific examples of the compound (I) are shown below.

[Chemical formula 14]

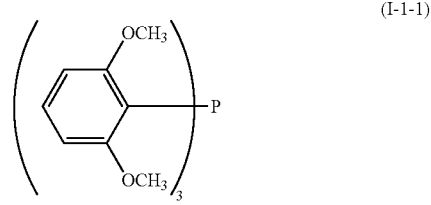

(I-1-1)

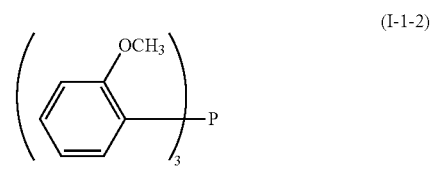

(I-1-2)

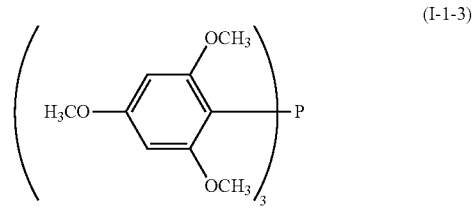

(I-1-3)

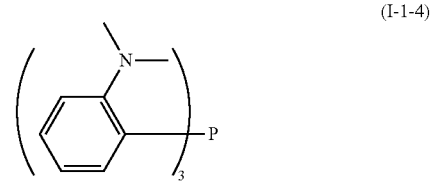

(I-1-4)

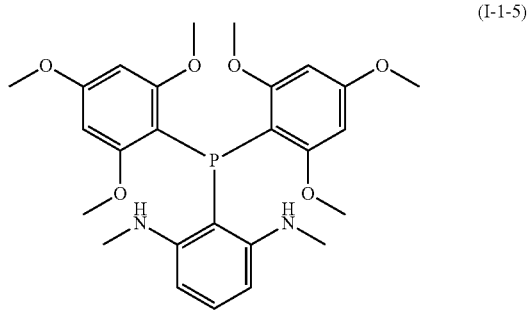

(I-1-5)

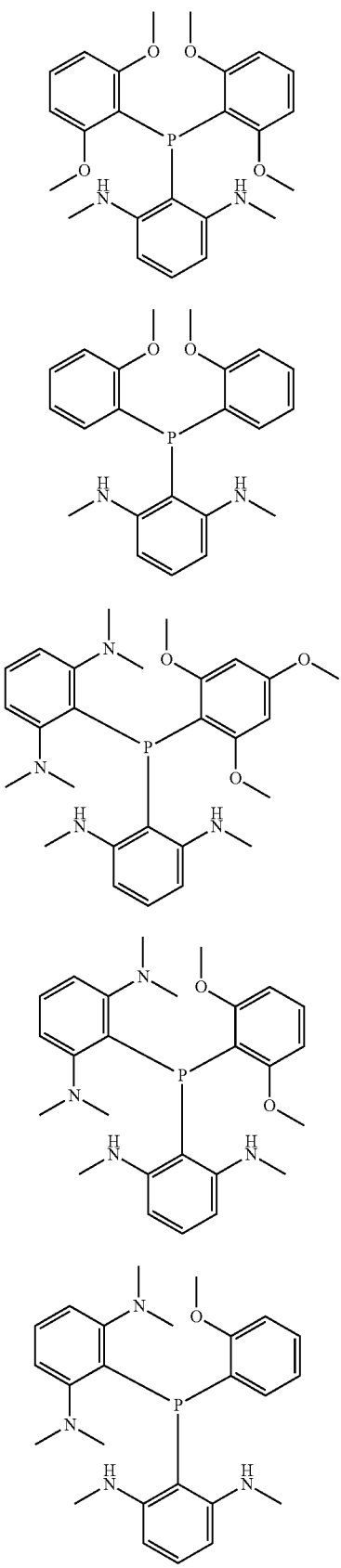

(I-1-6)
(I-1-7)
(I-1-8)
(I-1-9)
(I-1-10)

Further, other specific examples of the compound (I) include the compounds of the phosphorus catalysts Nos. 12 to 170 mentioned below in Tables 15 to 20.

A single compound (I) may be used alone, or a combination of two or more compounds may be used.

The proportion of the compound (I) in the polyisocyanurate raw material composition of the present embodiment is, for example, greater than 0 mol % but not more than 10 mol %. The proportion of the compound (I) in the polyisocyanurate raw material composition is preferably at least 0.001 mol % but not more than 5 mol %, more preferably at least 0.01 mol % but not more than 2 mol %, and even more preferably at least 0.05 mol % but not more than 2 mol %. Provided the proportion of the compound (I) is at least as large as the lower limit of the above range, favorable reaction efficiency can be achieved. Further, provided the proportion of the compound (I) is not more than the upper limit of the above range, a balance with the other components can be more easily achieved.

The ratio (molar ratio) between the polyfunctional isocyanate and the compound (I), namely the ratio: polyfunctional isocyanate/compound (I), is preferably within a range from 100/0.001 to 100/5, more preferably from 100/0.01 to 100/2, and even more preferably from 100/0.05 to 100/2.

(Epoxy Compound)

The epoxy compound in the present embodiment is a compound containing one or more epoxy groups. The epoxy compound may use any of the compounds typically used in isocyanate trimerization reactions without any particular limitations. The epoxy equivalent weight of the epoxy compound is not particular limited, but is preferably from 50 g/mol to 1,000 g/mol, more preferably from 100 g/mol to 500 g/mol, and even more preferably from 100 g/mol to 300 g/mol.

Specific examples of the epoxy compound include:

monoepoxides such as allyl glycidyl ether, butyl glycidyl ether, phenyl glycidyl ether, butylene oxide, propylene oxide, octylene oxide, styrene oxide, glycidol, and the glycidyl ester of versatic acid;

diepoxides such as diglycidyl 1,2-cyclohexanedicarboxylate, bisphenol A diglycidyl ether, bisphenol F diglycidyl ether, butadiene epoxide, 3,4-epoxycyclohexylmethyl-(3,4-epoxy)cyclohexane carboxylate, bicyclohexene dioxide, 4,4'-di(1,2-epoxyethyl)diphenyl ether, 4,4'-di(1,2-epoxyethyl)biphenyl, 2,2-bis(3,4-epoxycyclohexyl)propane, resorcin diglycidyl ether, methylfluoroglycine diglycidyl ether, bis(2,3-epoxycyclopentyl) ether, 2-(3,4-epoxy)cyclohexane-m-dioxane, bis(3,4-epoxy-6-methylcyclohexyl) adipate, and N,N'-m-phenylenebis(4,5-epoxy-1,2-cyclohexane) dicarboximide; and trifunctional or higher epoxides such as triglycidyl isocyanurate, para-aminophenol triglycidyl ether, poly(allyl glycidyl ether), 1,3,5-(1,2-epoxyethyl)benzene-2,2',4,4'-tetraglycidoxybenzophenone, tetraglycidoxytetraphenylethane, phenol novolac polyglycidyl ether, cresol novolac polyglycidyl ether, glycerol triglycidyl ether, and trimethylolpropane triglycidyl ether.

Among the above compounds, compounds such as phenyl glycidyl ether, styrene oxide, diglycidyl 1,2-cyclohexanedicarboxylate, bisphenol A diglycidyl ether, triglycidyl isocyanurate, phenol novolac polyglycidyl ether, and cresol novolac polyglycidyl ether can be easily obtained industrially, and are consequently preferred as the epoxy compound.

A single epoxy compound may be used alone, or a combination of two or more epoxy compounds may be used.

The proportion of the epoxy compound in the polyisocyanurate raw material composition of the present embodiment is, for example, greater than 0 mol % but not more than 20 mol %. The proportion of the compound (I) in the polyisocyanurate raw material composition is preferably at least 0.001 mol % but not more than 15 mol %, more preferably at least 0.005 mol % but not more than 10 mol %, and even more preferably at least 0.1 mol % but not more than 7 mol %. Provided the proportion of the compound (I) is at least as large as the lower limit of the above range, favorable reaction efficiency can be achieved. Further, provided the proportion of the compound (I) is not more than the upper limit of the above range, a balance with the other components can be more easily achieved.

The ratio (molar ratio) between the polyfunctional isocyanate and the epoxy compound, namely the ratio: polyfunctional isocyanate/epoxy compound, is preferably within a range from 100/0.001 to 100/15, more preferably from 100/0.005 to 100/10, and even more preferably from 100/0.1 to 100/7.

(Optional Components)

The polyisocyanurate raw material composition of the present embodiment may also include one or more other components in addition to the polyfunctional isocyanate, the compound (I) and the epoxy compound described above. Examples of these other components include solvents, curing accelerators, silane coupling agents, antioxidants, release agents, antifoaming agents, emulsifiers, thixotropy-imparting agents, leveling agents, flame retardants, pigments, fillers, and shrinkage retardants.

By heating the polyisocyanurate raw material composition of the present embodiment, a trimerization reaction of the polyfunctional isocyanate proceeds, and a polyisocyanurate is produced. The compound (I) and the epoxy compound function mainly as catalysts for the polyfunctional isocyanate trimerization reaction. Phosphorus catalysts generally have low hygroscopicity, meaning foaming during heating is suppressed, but when used as the catalyst for a polyisocyanurate production reaction, tend to suffer from low reactivity, meaning satisfactory curing (yield) can often not be obtained. However, as illustrated in the examples below, because the compound (I) has the specific structure represented by the above general formula (I), when used as a catalyst for a polyisocyanurate production reaction, the compound (I) exhibits superior reactivity, and satisfactory curing (yield) can be achieved. In other words, the compound (I) has low hygroscopicity as well as high reactivity as a catalyst, and therefore when heat curing is conducted, foaming can be suppressed and satisfactory curing can be achieved.

Second Embodiment

In one embodiment, the present invention provides a polyisocyanurate raw material composition containing a polyfunctional isocyanate and the compound (I).

(Polyfunctional Isocyanate)

The polyfunctional isocyanate is the same as that described above in the first embodiment. Preferred examples of the polyfunctional isocyanate include the same compounds as those exemplified above in the first embodiment.

Among the various possibilities, the polyfunctional isocyanate is preferably diphenylmethane diisocyanate, tolylene diisocyanate, hexamethylene diisocyanate, bis(isocyanatomethyl)cyclohexane, or a modified polyisocyanate thereof.

A single polyfunctional isocyanate may be used alone, or a combination of two or more polyfunctional isocyanates may be used.

The proportion of the polyfunctional isocyanate in the polyisocyanurate raw material composition of the present embodiment is, for example, typically at least 90 mol % but less than 100 mol %. The proportion of the polyfunctional isocyanate in the polyisocyanurate raw material composition is preferably at least 95 mol % but not more than 99.99 mol %, more preferably at least 98 mol % but not more than 99.99 mol %, and even more preferably at least 98 mol % but not more than 99.95 mol %. Provided the proportion of the polyfunctional isocyanate is at least as large as the lower limit of the above range, favorable heat resistance can be achieved. Further, provided the proportion of the polyfunctional isocyanate is not more than the upper limit of the above range, a balance with the other components can be more easily achieved.

(Compound (I))

The compound (I) is the same as that described above in the first embodiment. Preferred examples of the compound (I) include the same compounds as those exemplified above in the first embodiment.

Among the various possibilities, the compound (I) is preferably a compound in which each of $R^1$ and $R^2$ in general formula (I) independently represents a hydrogen atom, an alkoxy group of 1 to 4 carbon atoms, a monoalkylamino group of 1 to 4 carbon atoms, or a dialkylamino group of 2 to 8 carbon atoms (provided that $R^1$ and $R^2$ are not both hydrogen atoms).

Further, the compound (I) is preferably a compound represented by the above general formula (I-1), and is more preferably a compound in which each of $R^1$ and $R^2$ in general formula (I-1) independently represents a hydrogen atom, an alkoxy group of 1 to 4 carbon atoms, a monoalkylamino group of 1 to 4 carbon atoms, or a dialkylamino group of 2 to 8 carbon atoms (provided that $R^1$ and $R^2$ are not both hydrogen atoms).

In the above description, the alkoxy group of 1 to 4 carbon atoms is preferably an alkoxy group of 1 to 3 carbon atoms, more preferably an ethoxy group or a methoxy group, and even more preferably a methoxy group. Each alkyl group in the monoalkylamino group of 1 to 4 carbon atoms or dialkylamino group of 2 to 8 carbon atoms is preferably an alkyl group of 1 to 4 carbon atoms, and more preferably an alkyl group of 1 to 3 carbon atoms, and a methylamino group or dimethylamino group is even more preferred.

Specific examples of the compound (I) include the compounds represented by formula (I-1-1) to (I-1-10) shown above, and the compounds of the phosphorus catalysts Nos. 12 to 170 mentioned below in Tables 15 to 20.

A single compound (I) may be used alone, or a combination of two or more compounds may be used.

The proportion of the compound (I) in the polyisocyanurate raw material composition of this embodiment is, for example, greater than 0 mol % but not more than 10 mol %. The proportion of the compound (I) in the polyisocyanurate raw material composition is preferably at least 0.001 mol % but not more than 5 mol %, more preferably at least 0.01 mol % but not more than 2 mol %, and even more preferably at least 0.05 mol % but not more than 2 mol %. Provided the proportion of the compound (I) is at least as large as the lower limit of the above range, favorable reaction efficiency can be achieved. Further, provided the proportion of the compound (I) is not more than the upper limit of the above range, a balance with the other components can be more easily achieved.

Furthermore, the ratio (molar ratio) between the polyfunctional isocyanate and the compound (I), namely the ratio: polyfunctional isocyanate/compound (I), is preferably within a range from 100/0.001 to 100/5, more preferably from 100/0.01 to 100/2, and even more preferably from 100/0.05 to 100/2.

(Optional Components)

The polyisocyanurate raw material composition of the present embodiment may also include one or more other components in addition to the polyfunctional isocyanate and the compound (I) described above. Examples of these other components include the same components as those exemplified above for the first embodiment.

By mixing the polyisocyanurate raw material composition of the present embodiment with an epoxy compound and then heating the resulting mixture, a trimerization reaction of the polyfunctional isocyanate proceeds, and a polyisocyanurate is produced. The same compounds as those mentioned above in the description of the first embodiment may be used as the epoxy compound. In a similar manner to that described for the polyisocyanurate raw material composition of the first embodiment, the compound (I) and the epoxy compound function mainly as catalysts for the polyfunctional isocyanate trimerization reaction. The compound (I) has low hygroscopicity as well as high reactivity as a catalyst, and therefore when heat curing is conducted, foaming can be suppressed and satisfactory curing (yield) can be achieved.

[Polyisocyanurate Production Kit]

A polyisocyanurate production kit of an embodiment of the present invention contains a polyfunctional isocyanate, the compound (I), and an epoxy compound.

Examples of the kit of the present embodiment include kits containing an appropriate combination of (a) a polyfunctional isocyanate, (b) the compound (I), (c) an epoxy compound, (d) a composition containing a polyfunctional isocyanate and the compound (I), and (e) a composition containing a polyfunctional isocyanate and an epoxy compound, each housed in a different container.

In the kit of an embodiment of the present invention, there are no particular limitations on the amounts of the polyfunctional isocyanate, the compound (I) and the epoxy compound housed in each of the containers, but the amounts are preferably set in accordance with the mixing ratio required between the components during production of the polyisocyanurate.

For example, the molar ratio between the total molar amount of the polyfunctional isocyanate and the total molar amount of the compound (I) in the kit of an embodiment of the present invention, namely the ratio: polyfunctional isocyanate/compound (I), is preferably within a range from 100/0.001 to 100/5, more preferably from 100/0.01 to 100/2, and even more preferably from 100/0.05 to 100/2.

Further, for example, the molar ratio between the total molar amount of the polyfunctional isocyanate and the total molar amount of the epoxy compound in the kit of an embodiment of the present invention, namely the ratio: polyfunctional isocyanate/epoxy compound, is preferably within a range from 100/0.001 to 100/15, more preferably from 100/0.005 to 100/10, and even more preferably from 100/0.1 to 100/7.

There are no particular limitations on the containers, and arbitrary containers may be used. The material for the containers may be any material not corroded by the contents, and examples include glass, resins and metals.

First Embodiment (Kit Containing (a), (b) and (c))

In one embodiment, the present invention provides a polyisocyanurate production kit containing: (a) a polyfunctional isocyanate, (b) the compound (I), and (c) an epoxy compound, wherein the components (a) to (c) are each housed in a different container.

(Polyfunctional Isocyanate)

The polyfunctional isocyanate is the same as that mentioned above in the description of the first embodiment in the section entitled "[Polyisocyanurate Raw Material Composition]". Preferred examples of the polyfunctional isocyanate also include the same compounds as those exemplified above in the first embodiment in the section entitled "[Polyisocyanurate Raw Material Composition]".

(Compound (I))

The compound (I) is the same as that mentioned above in the description of the first embodiment in the section entitled "[Polyisocyanurate Raw Material Composition]". Preferred examples of the compound (I) also include the same compounds as those exemplified above in the first embodiment in the section entitled "[Polyisocyanurate Raw Material Composition]".

The compound (I) is preferably housed in the container in a solution state dissolved in a solvent. There are no particular limitations on the solvent, provided it is capable of dissolving the compound (I), and conventional organic solvents and the like may be used.

(Epoxy Compound)

The epoxy compound is the same as that mentioned above in the description of the first embodiment in the section entitled "[Polyisocyanurate Raw Material Composition]". Preferred examples of the epoxy compound also include the same compounds as those exemplified above in the first embodiment in the section entitled "[Polyisocyanurate Raw Material Composition]".

During production of the polyisocyanurate, (a) the polyfunctional isocyanate, (b) the compound (I), and (c) the epoxy compound contained in the kit of the present embodiment are mixed together. By then heating the resulting mixture, a trimerization reaction of the polyfunctional isocyanate proceeds, and a polyisocyanurate can be obtained.

Second Embodiment (Kit Containing (d) and (c))

In one embodiment, the present invention provides a polyisocyanurate production kit containing: (d) a composition containing a polyfunctional isocyanate and the compound (I), and (c) an epoxy compound, wherein the components (d) and (c) are each housed in a different container.

(Composition (d))

The kit of the present embodiment includes a composition (hereafter also referred to as "the composition (d)") containing a polyfunctional isocyanate and the compound (I).

The composition (d) is the same as the polyisocyanurate raw material composition according to the second embodiment described above in the section entitled "[Polyisocyanurate Raw Material Composition]".

(Epoxy Compound)

The epoxy compound is the same as that in the kit according to the first embodiment described above.

During production of the polyisocyanurate, the composition (d) and the epoxy compound (c) contained in the kit of the present embodiment are mixed together. By then heating the resulting mixture, a trimerization reaction of the polyfunctional isocyanate proceeds, and a polyisocyanurate can be obtained.

Third Embodiment (Kit Containing (d) and (e))

In one embodiment, the present invention provides a polyisocyanurate production kit containing: (d) a composition containing a polyfunctional isocyanate and the compound (I), and (e) a composition containing a polyfunctional isocyanate and an epoxy compound, wherein the components (d) and (e) are each housed in a different container.
(Composition (d))

The composition (d) is the same as that in the kit according to the second embodiment described above.
(Composition (e))

The kit of the present embodiment includes a composition (also referred to as "the composition (e)") containing a polyfunctional isocyanate compound and an epoxy compound.

The polyfunctional isocyanate contained in the composition (e) is the same as that mentioned above in the description of the first embodiment in the section entitled "[Polyisocyanurate Raw Material Composition]". Preferred examples of the polyfunctional isocyanate also include the same compounds as those exemplified above in the first embodiment in the section entitled "[Polyisocyanurate Raw Material Composition]".

The polyfunctional isocyanate may be the same as, or different from, the polyfunctional isocyanate contained in the composition (d).

The epoxy compound contained in the composition (e) is the same as that mentioned above in the description of the first embodiment in the section entitled "[Polyisocyanurate Raw Material Composition]". Preferred examples of the epoxy compound also include the same compounds as those exemplified above in the first embodiment in the section entitled "[Polyisocyanurate Raw Material Composition]".

During production of the polyisocyanurate, the composition (d) and the composition (e) contained in the kit of the present embodiment are mixed together. By then heating the resulting mixture, a trimerization reaction of the polyfunctional isocyanate proceeds, and a polyisocyanurate can be obtained.

Fourth Embodiment (Kit Containing (b) and (e))

In one embodiment, the present invention provides a polyisocyanurate production kit containing: (e) a composition containing a polyfunctional isocyanate and an epoxy compound, and (b) the compound (I), wherein the components (e) and (b) are each housed in a different container.
(Composition (e))

The composition (e) is the same as that in the kit according to the third embodiment described above.
(Compound (I))

The compound (I) is the same as that in the kit according to the first embodiment described above.

During production of the polyisocyanurate, the composition (e) and (b) the compound (I) contained in the kit of the present embodiment are mixed together. By then heating the resulting mixture, a trimerization reaction of the polyfunctional isocyanate proceeds, and a polyisocyanurate can be obtained.

The kits of the first through fourth embodiments described above may also include, in addition to the respective components described above, various other optional components. Examples of these optional components include instructions for producing the polyisocyanurate, or a mold for molding the polyisocyanurate raw material composition. Further, in those cases where the polyfunctional isocyanate (a) contained in the kit of the first embodiment, or the polyfunctional isocyanate contained in the composition (d) or composition (e) of the kits of the second through fourth embodiments is a blocked polyfunctional isocyanate, the kits of the first through fourth embodiments may also include, as an optional component, a reagent for deprotecting the blocked polyfunctional isocyanate.
[Polyisocyanurate Raw Material Cured Product]

In one embodiment, the present invention provides a polyisocyanurate raw material cured product obtained by heating a polyisocyanurate raw material composition containing a polyfunctional isocyanate, the compound (I) and an epoxy compound. The polyisocyanurate raw material cured product also contains, in addition to the polyisocyanurate produced from the polyfunctional isocyanate, unreacted polyfunctional isocyanate or dimers, catalysts, modified products of the catalysts, and other impurities.

There are no particular limitations on the polyisocyanurate, provided it has a structure in which a plurality of isocyanurate rings are linked arbitrarily via divalent organic groups. The structure of the polyisocyanurate may be represented, for example, by general formula (II) shown below.

[Chemical formula 15]

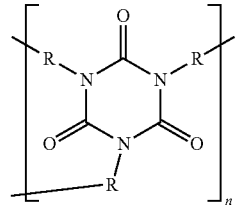

(II)

[In the formula, R represents a divalent organic group, and n represents an integer of 2 or greater. The plurality of R groups may be the same or different.]

In general formula (II), R is a divalent organic group derived from the polyfunctional isocyanate.

In those cases where the polyfunctional isocyanate used in the trimerization reaction is an aliphatic isocyanate, R is an aliphatic hydrocarbon group (for example, an alkylene group). In those cases where the polyfunctional isocyanate used in the trimerization reaction is an aromatic isocyanate, R is an aromatic hydrocarbon group (for example, an arylene group).

The polyisocyanurate has a structure in which isocyanurate rings are linked randomly via divalent organic groups, and specifying the overall structure is difficult. The polyisocyanurate raw material cured product of the present embodiment may contain a plurality of polyisocyanurate s having different structures and molecular weights. Further, the polyisocyanurate raw material cured product of the present embodiment may also contain the compound (I) and epoxy compound described below, or reaction products (modified products) thereof.

The polyfunctional isocyanate is the same as that mentioned above in the description of the first embodiment in the section entitled "[Polyisocyanurate Raw Material Composition]". Preferred examples of the polyfunctional isocyanate also include the same compounds as those exemplified above in the first embodiment in the section entitled "[Polyisocyanurate Raw Material Composition]".

The compound (I) is the same as that mentioned above in the description of the first embodiment in the section entitled "[Polyisocyanurate Raw Material Composition]". Preferred examples of the compound (I) also include the same compounds as those exemplified above in the first embodiment in the section entitled "[Polyisocyanurate Raw Material Composition]".

The epoxy compound is the same as that mentioned above in the description of the first embodiment in the section entitled "[Polyisocyanurate Raw Material Composition]". Preferred examples of the epoxy compound also include the same compounds as those exemplified above in the first embodiment in the section entitled "[Polyisocyanurate Raw Material Composition]".

The polyisocyanurate raw material cured product of the present embodiment can be obtained by mixing the polyfunctional isocyanate, the compound (I) and the epoxy compound, and then heating the resulting mixture. The "heating" may be conducted in the same manner as the heating step described below in the section entitled "[Method for Producing Polyisocyanurate]".

The polyisocyanurate raw material cured product of the present embodiment may contain the polyisocyanurate, and at least one compound selected from the group consisting of the compound (I) and compounds represented by general formula (I') shown below (hereafter also referred to as "the compound (I')").

[Chemical formula 16]

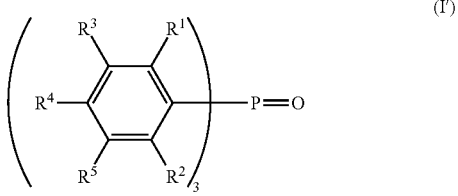

[In general formulas (I) and (I'), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. However, $R^1$ and $R^2$ may not both be hydrogen atoms. Each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom. The three of each of $R^1$ to $R^5$ may be the same or different.]

The proportion of the polyisocyanurate in the polyisocyanurate raw material cured product of the present embodiment is, for example, preferably at least 70% by mass but less than 100% by mass, and more preferably from 80 to 99% by mass.

(Compound (I))

The compound (I) is the same as that mentioned above in the description of the first embodiment in the section entitled "[Polyisocyanurate Raw Material Composition]". Preferred examples of the compound (I) also include the same compounds as those exemplified above in the first embodiment in the section entitled "[Polyisocyanurate Raw Material Composition]".

(Compound (I'))

The compound (I') is an oxide of the compound (I).

$R^1$ to $R^5$ in general formula (I') are the same as $R^1$ to $R^5$ in general formula (I). Preferred examples of $R^1$ to $R^5$ in general formula (I') include the same atoms and groups as those exemplified above as preferred examples of $R^1$ to $R^5$ in general formula (I). The compound (I') is preferably an oxide of a compound exemplified as a preferred example of the above compound (I).

Preferred examples of the compound (I') include compounds represented by general formula (I'-1) shown below.

[Chemical formula 17]

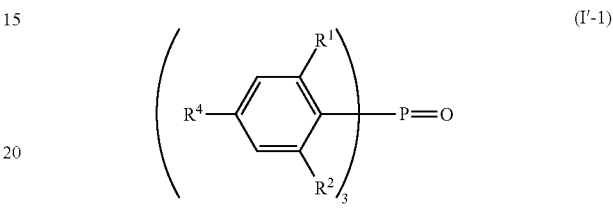

[In the formula, $R^1$, $R^2$ and $R^4$ are the same as $R^1$, $R^2$ and $R^4$ in the above general formula (I'). The three of each of R', $R^2$ and $R^4$ may be the same or different.]

$R^1$, $R^2$ and $R^4$ in general formula (I'-1) are the same as $R^1$, $R^2$ and $R^4$ in the above general formula (I'). Preferred examples of R', $R^2$ and $R^4$ in general formula (I'-1) include the same atoms and groups as those exemplified above as preferred example of $R^1$, $R^2$ and $R^4$ in the above general formula (I).

Among the various possibilities, each of $R^1$ and $R^2$ in general formula (I'-1) preferably independently represents a hydrogen atom, an alkoxy group of 1 to 4 carbon atoms, a monoalkylamino group of 1 to 4 carbon atoms, or a dimethylamino group of 2 to 8 carbon atoms (provided that $R^1$ and $R^2$ are not both hydrogen atoms). In the above description, the alkoxy group of 1 to 4 carbon atoms is preferably an alkoxy group of 1 to 3 carbon atoms, more preferably an ethoxy group or a methoxy group, and even more preferably a methoxy group. Each alkyl group in the monoalkylamino group of 1 to 4 carbon atoms or dialkylamino group of 2 to 8 carbon atoms is preferably an alkyl group of 1 to 4 carbon atoms, and more preferably an alkyl group of 1 to 3 carbon atoms, and a methylamino group or dimethylamino group is even more preferred.

The compound (I') contained in the polyisocyanurate raw material cured product of the present embodiment may be a single compound or a combination of two or more compounds.

The polyisocyanurate raw material cured product of the present embodiment may contain only the compound (I), may contain only the compound (I'), or may contain both the compound (I) and the compound (I'). In those cases where the polyisocyanurate raw material cured product of the present embodiment contains both the compound (I) and the compound (I'), the compound (I') is an oxide of the compound (I).

The total proportion of the compound (I) and the compound (I') in the polyisocyanurate raw material cured product of the present embodiment is, for example, preferably from 0.001 to 5% by mass, and more preferably from 0.001 to 1% by mass.

(Epoxy Compound and Reaction Products Thereof)

The polyisocyanurate raw material cured product of the present embodiment may also contain one or more other compounds in addition to the polyisocyanurate and the at least one compound selected from the group consisting of the compound (I) and the compound (I'). Examples of these other components include (i) epoxy compounds, (ii) reaction products of an epoxy compound and the polyfunctional isocyanate, (iii) reaction products of an epoxy compound and the compound (I) described above, and (iv) reaction products of an epoxy compound and an epoxy compound (hereafter, (i) to (iv) are sometimes jointly described as "epoxy compounds and the like").

[Epoxy Compounds]

The epoxy compound is the same as that mentioned above in the description of the first embodiment in the section entitled "[Polyisocyanurate Raw Material Composition]". Preferred examples of the epoxy compound also include the same compounds as those exemplified above in the first embodiment in the section entitled "[Polyisocyanurate Raw Material Composition]".

[Reaction Products of an Epoxy Compound and the Polyfunctional Isocyanate]

A reaction product of an epoxy compound and the polyfunctional isocyanate is a compound produced when the polyfunctional isocyanate and the epoxy compound undergo reaction upon heated reaction. There are no particular limitations on the reaction product of the epoxy compound and the polyfunctional isocyanate, provided it is a compound produced by the reaction of the epoxy compound and the polyfunctional isocyanate. Examples of the reaction product include compounds containing an oxazolidone ring.

[Reaction Products of an Epoxy Compound and the Compound (I)]

A reaction product of an epoxy compound and the compound (I) is a compound produced when the epoxy compound and the compound (I) undergo reaction upon heated reaction. There are no particular limitations on the reaction product of the epoxy compound and the compound (I), provided it is a compound produced by the reaction of the epoxy compound and the compound (I). For example, in those cases where the epoxy compound is a compound represented by general formula (E) shown below, examples of the reaction product of the epoxy compound and the compound (I) include compounds represented by general formula (E-1) shown below.

[Chemical formula 18]

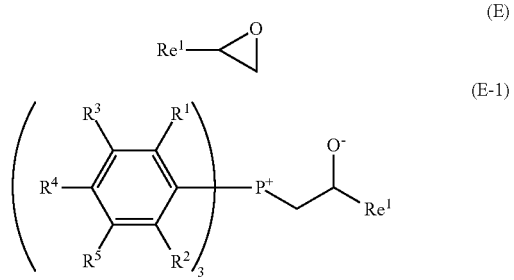

[In formula (E-1), $R^1$ to $R^5$ are the same as $R^1$ to $R^5$ in general formula (I). The three of each of $R^1$ to $R^5$ may be the same or different. In formulas (E) and (E-1), $Re^1$ represents an organic group.]

For example, in those cases where the epoxy compound is phenyl glycidyl ether, $Re^1$ in the above general formulas (E) and (E-1) is a phenoxymethyl group.

[Reaction Products of an Epoxy Compound and an Epoxy Compound]

A reaction product of an epoxy compound and an epoxy compound (namely, a reaction product of epoxy compounds) is a compound produced when two or more epoxy compounds undergo reaction upon heated reaction. There are no particular limitations on the reaction product of the epoxy compounds, provided it is a compound produced by the reaction of two or more epoxy compounds. For example, in those cases where the epoxy compounds are compounds represented by general formula (E) shown above, examples of the reaction product of an epoxy compound and an epoxy compound include polymers having a repeating unit represented by general formula (E-2) shown below.

[Chemical formula 19]

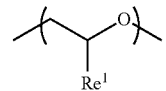

[In formula (E-2), $Re^1$ represents an organic group.]

For example, in those cases where the epoxy compound is phenyl glycidyl ether, $Re^1$ in general formula (E-2) is a phenoxymethyl group.

The total proportion of epoxy compounds in the polyisocyanurate raw material cured product of the present embodiment is, for example, preferably within a range from 0.001 to 30% by mass, and more preferably from 0.01 to 20% by mass.

Examples of the polyisocyanurate raw material cured product of the present embodiment include cured products containing, for example, at least 70% by mass but less than 100% by mass (and preferably 79% by mass to 99.98% by mass) of the polyisocyanurate, greater than 0% by mass but not more than 5% by mass (and preferably 0.001 to 1% by mass) of a combination of the compound (I) and the compound (I'), and greater than 0% by mass but not more than 30% by mass (and preferably 0.01 to 20% by mass) of a total amount of epoxy compounds and the like.

The polyisocyanurate raw material cured product of the present embodiment is produced using the compound (I) as a catalyst, and therefore exhibits little foaming and has satisfactory hardness. Accordingly, the polyisocyanurate raw material cured product of the present embodiment can be used in various applications, including coating materials, adhesives, sealants and optical componentry.

[Method for Producing Polyisocyanurate]

In one embodiment, the present invention provides a method for producing a polyisocyanurate that includes a mixing step of mixing a polyfunctional isocyanate, a compound (I) represented by the above general formula (I) and an epoxy compound, and a heating step of heating the mixture obtained in the mixing step.

<<Mixing Step>>

The mixing step is a step of mixing a polyfunctional isocyanate, the compound (I) and an epoxy compound.

(Polyfunctional Isocyanate)

The polyfunctional isocyanate is the same as that mentioned above in the description of the first embodiment in the section entitled "[Polyisocyanurate Raw Material Composition]". Preferred examples of the polyfunctional isocyanate also include the same compounds as those exemplified above in the first embodiment in the section entitled "[Polyisocyanurate Raw Material Composition]".

(Compound (I))

The compound (I) is the same as that mentioned above in the description of the first embodiment in the section entitled "[Polyisocyanurate Raw Material Composition]". Preferred examples of the compound (I) also include the same compounds as those exemplified above in the first embodiment in the section entitled "[Polyisocyanurate Raw Material Composition]".

(Epoxy Compound)

The epoxy compound is the same as that mentioned above in the description of the first embodiment in the section entitled "[Polyisocyanurate Raw Material Composition]". Preferred examples of the epoxy compound also include the same compounds as those exemplified above in the first embodiment in the section entitled "[Polyisocyanurate Raw Material Composition]".

The mixing ratio (molar ratio) between the polyfunctional isocyanate and the compound (I), namely the ratio: polyfunctional isocyanate/compound (I), is preferably within a range from 100/0.001 to 100/5, more preferably from 100/0.01 to 100/2, and even more preferably from 100/0.05 to 100/2.

Further, the mixing ratio (molar ratio) between the polyfunctional isocyanate and the epoxy compound, namely the ratio: polyfunctional isocyanate/epoxy compound, is preferably within a range from 100/0.001 to 100/15, more preferably from 100/0.005 to 100/10, and even more preferably from 100/0.1 to 100/7.

In the mixing step, there are no particular limitations on the order in which the polyfunctional isocyanate, the compound (I) and the epoxy compound are mixed, but from the viewpoint of suppressing the progression of unintended reactions, the compound (I) and the epoxy compound are preferably not mixed together first.

The mixing step may also be, for example, a step of mixing the epoxy compound with a mixture (d) of the polyfunctional isocyanate and the compound (I). The polyisocyanurate raw material composition according to the second embodiment described above in the section entitled "[Polyisocyanurate Raw Material Composition]" may be used as the mixture (d).

The mixing step may also be, for example, a step of mixing the compound (I) with a mixture (e) of the polyfunctional isocyanate and the epoxy compound. A mixture with the same composition as the composition (e) included in the polyisocyanurate production kit according to the fourth embodiment described above in the section entitled "[Polyisocyanurate Production Kit]" may be used as the mixture (e).

The mixing step may also be, for example, a step of mixing a mixture (e) of the polyfunctional isocyanate and the epoxy compound with a mixture (d) of the polyfunctional isocyanate and the compound (I). A mixture with the same composition as the composition (d) included in the polyisocyanurate production kit according to the third embodiment described above in the section entitled "[Polyisocyanurate Production Kit]" may be used as the mixture (d). Further, a mixture with the same composition as the composition (e) included in the polyisocyanurate production kit according to the third embodiment described above in the section entitled "[Polyisocyanurate Production Kit]" may be used as the mixture (e).

In those cases where the polyfunctional isocyanate contains a blocked polyfunctional isocyanate, a deprotection reaction of the blocked isocyanato groups may be conducted before the mixing step, after the mixing step, or during the mixing step. The deprotection reaction may be selected appropriately in accordance with the type of protective groups used for blocking the isocyanato groups.

<<Heating Step>>

The heating step is a step of heating the mixture obtained in the above mixing step.

After the mixing step, the mixture of the polyfunctional isocyanate, the compound (I) and the epoxy compound is stirred appropriately and transferred into a mold by pouring or the like, and a heating reaction is then conducted. The heating temperature may be any temperature sufficient to enable the polyisocyanurate production reaction to proceed satisfactorily, and for example, is typically within a range from 40 to 240° C., and preferably from 60 to 200° C.

The heating time may be any time sufficient to ensure production of the polyisocyanurate, and for example, is typically from 1 to 360 minutes, and preferably from 30 to 180 minutes.

The heating may be conducted in two stages. For example, in the first stage, heating may be conducted at a comparatively low temperature, and then in the second stage, heating may be conducted at a higher temperature than the first stage. The heating temperature for the first stage is typically within a range from 60 to 120° C., and preferably from 70 to 110° C. The first stage heating time is typically from 1 to 180 minutes, and preferably from 30 to 150 minutes. The heating temperature for the second stage is typically within a range from 120 to 240° C., and preferably from 150 to 210° C. The second stage heating time is typically from 1 to 180 minutes, and preferably from 30 to 150 minutes. By conducting the heating in two stages, warping and cracking accompanying curing shrinkage can be suppressed.

The polyisocyanurate or polyisocyanurate raw material cured product can be produced in the manner described above. By using the production method of the present embodiment, the polyfunctional isocyanate trimerization reaction proceeds efficiently with the compound (I) and the epoxy compound acting as catalysts. Further, because the compound (I) has low hygroscopicity, a polyisocyanurate or polyisocyanurate raw material cured product having little foaming can be obtained.

[Catalyst for Polyisocyanurate Production Reaction]

In one embodiment, the present invention provides a polyisocyanurate production reaction catalyst containing a combination of a compound (I) represented by general formula (I) shown above and an epoxy compound.

Further, in one embodiment, the present invention provides a polyisocyanurate production kit that includes, as a polyisocyanurate production reaction catalyst, a combination of a compound (I) represented by general formula (I) shown above and an epoxy compound.

The compound (I) is the same as that mentioned above in the description of the first embodiment in the section entitled "[Polyisocyanurate Raw Material Composition]". Preferred examples of the compound (I) also include the same compounds as those exemplified above in the first embodiment in the section entitled "[Polyisocyanurate Raw Material Composition]".

The epoxy compound is the same as that mentioned above in the description of the first embodiment in the section entitled "[Polyisocyanurate Raw Material Composition]". Preferred examples of the epoxy compound also include the same compounds as those exemplified above in the first embodiment in the section entitled "[Polyisocyanurate Raw Material Composition]".

By using the above combination of a compound (I) represented by general formula (I) and an epoxy compound as a catalyst for the polyisocyanurate production reaction, when heating is conducted, foaming can be suppressed and satisfactory curing (yield) can be achieved.

[Adhesive]

In one embodiment, the present invention provides an adhesive formed from the polyisocyanurate raw material composition described above.

The above polyisocyanurate raw material composition has good curability and excellent adhesiveness, and can therefore be used favorably for adhesive applications. There are no particular limitations on the material of the adherends, and examples include metal materials such as aluminum, chromium, copper, magnesium, nickel, tin, titanium, zinc and alloys using two or more types of metal; and plastic materials such as polyamide, polycarbonate, polyetheretherketone, polyimide and epoxy resins.

In order to improve the adhesive strength, the adherends may be subjected to a preliminary surface treatment such as a degreasing treatment, etching treatment or chemical treatment. The polyisocyanurate raw material composition may also be provided in the form of the polyisocyanurate production kit described above. In other words, the polyisocyanurate production kit may also be used as an adhesive kit.

When the polyisocyanurate raw material composition is used as an adhesive, typical methods may be used as the method for adhering the adherends. For example, an appropriate amount of the adhesive of the present embodiment (the polyisocyanurate raw material composition) may be applied to one adherend, the other adherend then bonded to the coating surface of the adhesive, and curing of the adhesive then conducted under the same heating conditions as those described above for the "<<Heating Step>>" in the section entitled "[Method for Producing Polyisocyanurate]". The adhesive of the present embodiment cures upon heating, and is therefore a thermosetting adhesive.

EXAMPLES

The present invention is described below in more detail using a series of examples and comparative examples, but the present invention is in no way limited by these examples.

Production and Evaluation of Polyisocyanurate Raw Material Compositions

Examples 1 to 40, Comparative Examples 1 to 69

A mixture (d) of a polyfunctional isocyanate and a catalyst (the compound (I) or another catalyst), and a mixture (e) of a polyfunctional isocyanate and an epoxy compound were prepared. The mixture (d) and the mixture (e) were then mixed to produce a polyisocyanurate raw material composition. The blend ratio (molar ratio) between the polyfunctional isocyanate, the catalyst and the epoxy compound was set in accordance with the various examples shown in Tables 1 to 11, thus obtaining polyisocyanurate raw material compositions of Examples 1 to 40 and Comparative Examples 1 to 69.

<Evaluation of Gel Time>

Each of the polyisocyanurate raw material compositions from Examples 1 to 40 and Comparative Examples 1 to 69 was placed in a glass container and then heated to 80° C. in an oil bath (EOS-200RD, manufactured by AS ONE Corporation). With the temperature held at 80° C., the composition was checked for gelling every 30 minutes, and the time taken for gelling to occur was measured. Gelling was evaluated visually based on the presence or absence of fluidity, with the point where fluidity disappeared being deemed to indicate gelling had occurred.

The results are shown in Table 1 to 12. The evaluation criteria for the results in the tables were as follows.

Evaluation Criteria

A: gelling was confirmed in less than 360 minutes

B: gelling was not confirmed even after 360 minutes or more had elapsed

<Evaluation of Foaming>

Each of the polyisocyanurate raw material compositions from Examples 1 to 40 and Comparative Examples 1 to 69 was placed in an aluminum container and then heated at 80° C. for 180 minutes in a convection drying oven (VTR-111, manufactured by Isuzu Seisakusho Co., Ltd.) to produce a polyisocyanurate raw material cured product. The thus produced cured product was inspected under a microscope (RH-2000, manufactured by HIROX Co., Ltd.), and the number of bubbles in a random 1 cm×1 cm square were counted.

The results are shown in Tables 1 to 12. The evaluation criteria for the results in the tables were as follows.

Evaluation Criteria

A: number of bubbles was fewer than 10

B: number of bubbles was 10 or greater

-: not evaluated (a polyisocyanurate raw material cured product could not be produced (curing did not occur)

TABLE 1

|  |  | Example 1 | Example 2 | Example 3 | Example 4 | Example 5 | Example 6 | Example 7 | Example 8 |
|---|---|---|---|---|---|---|---|---|---|
| Polyfunctional isocyanate [molar ratio] | MDI | 100 | 100 | 100 | 100 | | | | |
| | TDI | | | | | 100 | 100 | 100 | 100 |
| | HDI | | | | | | | | |
| | Takenate 600 | | | | | | | | |
| | Coronate HX | | | | | | | | |
| | Duranate D201 | | | | | | | | |
| Catalyst [molar ratio] (Compound (I)) | TMPP | 0.1 | | | | 0.1 | | | |
| | DMPP | | 0.1 | | | | 0.1 | | |
| | TOAP | | | 0.1 | | | | 0.1 | |
| | TODMAPP | | | | 0.1 | | | | 0.1 |
| Catalyst [molar ratio] | TPP | | | | | | | | |
| | TOTP | | | | | | | | |
| | TPTP | | | | | | | | |
| | TPAP | | | | | | | | |
| | DPCP | | | | | | | | |
| | TCHP | | | | | | | | |
| | TOCP | | | | | | | | |
| | TEA | | | | | | | | |
| | TBAC | | | | | | | | |
| | Potassium 2-ethylhexanoate | | | | | | | | |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Epoxy compound [molar ratio] | PGE | 5 | 5 | 5 | 5 | 5 | 5 | 5 | 5 |
|  | BADGE |  |  |  |  |  |  |  |  |
|  | TGIC |  |  |  |  |  |  |  |  |
|  | Styrene oxide |  |  |  |  |  |  |  |  |
|  | CHDADGE |  |  |  |  |  |  |  |  |
| Gel time | Gel time [minutes] | 30 | 30 | 120 | 30 | 30 | 30 | 90 | 30 |
|  | Gel time [evaluation] | A | A | A | A | A | A | A | A |
| Foaming | Foaming [number of bubbles] | 0 | 0 | 4 | 1 | 0 | 0 | 2 | 1 |
|  | Foaming [evaluation] | A | A | A | A | A | A | A | A |

TABLE 2

|  |  | Example 9 | Example 10 | Example 11 | Example 12 | Example 13 | Example 14 | Example 15 | Example 16 |
|---|---|---|---|---|---|---|---|---|---|
| Polyfunctional isocyanate [molar ratio] | MDI |  |  |  |  |  |  |  |  |
|  | TDI |  |  |  |  |  |  |  |  |
|  | HDI | 100 | 100 | 100 | 100 |  |  |  |  |
|  | Takenate 600 |  |  |  |  | 100 | 100 | 100 | 100 |
|  | Coronate HX |  |  |  |  |  |  |  |  |
|  | Duranate D201 |  |  |  |  |  |  |  |  |
| Catalyst [molar ratio] (Compound (I)) | TMPP | 0.1 |  |  |  | 0.1 |  |  |  |
|  | DMPP |  | 0.1 |  |  |  | 0.1 |  |  |
|  | TOAP |  |  | 0.1 |  |  |  | 0.1 |  |
|  | TODMAPP |  |  |  | 0.1 |  |  |  | 0.1 |
| Catalyst [molar ratio] | TPP |  |  |  |  |  |  |  |  |
|  | TOTP |  |  |  |  |  |  |  |  |
|  | TPTP |  |  |  |  |  |  |  |  |
|  | TPAP |  |  |  |  |  |  |  |  |
|  | DPCP |  |  |  |  |  |  |  |  |
|  | TCHP |  |  |  |  |  |  |  |  |
|  | TOCP |  |  |  |  |  |  |  |  |
|  | TEA |  |  |  |  |  |  |  |  |
|  | TBAC |  |  |  |  |  |  |  |  |
|  | Potassium 2-ethylhexanoate |  |  |  |  |  |  |  |  |
| Epoxy compound [molar ratio] | PGE | 5 | 5 | 5 | 5 | 5 | 5 | 5 | 5 |
|  | BADGE |  |  |  |  |  |  |  |  |
|  | TGIC |  |  |  |  |  |  |  |  |
|  | Styrene oxide |  |  |  |  |  |  |  |  |
|  | CHDADGE |  |  |  |  |  |  |  |  |
| Gel time | Gel time [minutes] | 30 | 30 | 150 | 90 | 120 | 150 | 180 | 150 |
|  | Gel time [evaluation] | A | A | A | A | A | A | A | A |
| Foaming | Foaming [number of bubbles] | 0 | 0 | 5 | 3 | 1 | 3 | 7 | 2 |
|  | Foaming [evaluation] | A | A | A | A | A | A | A | A |

TABLE 3

|  |  | Example 17 | Example 18 | Example 19 | Example 20 | Example 21 | Example 22 | Example 23 | Example 24 |
|---|---|---|---|---|---|---|---|---|---|
| Polyfunctional isocyanate [molar ratio] | MDI |  |  |  |  |  |  |  |  |
|  | TDI |  |  |  |  |  |  |  |  |
|  | HDI |  |  |  |  |  |  |  |  |
|  | Takenate 600 |  |  |  |  |  |  |  |  |
|  | Coronate HX | 100 | 100 | 100 | 100 |  |  |  |  |
|  | Duranate D201 |  |  |  |  | 100 | 100 | 100 | 100 |
| Catalyst [molar ratio] (Compound (I)) | TMPP | 0.1 |  |  |  | 0.1 |  |  |  |
|  | DMPP |  | 0.1 |  |  |  | 0.1 |  |  |
|  | TOAP |  |  | 0.1 |  |  |  | 0.1 |  |
|  | TODMAPP |  |  |  | 0.1 |  |  |  | 0.1 |
| Catalyst [molar ratio] | TPP |  |  |  |  |  |  |  |  |
|  | TOTP |  |  |  |  |  |  |  |  |
|  | TPTP |  |  |  |  |  |  |  |  |
|  | TPAP |  |  |  |  |  |  |  |  |
|  | DPCP |  |  |  |  |  |  |  |  |

TABLE 3-continued

|  |  | Example 17 | Example 18 | Example 19 | Example 20 | Example 21 | Example 22 | Example 23 | Example 24 |
|---|---|---|---|---|---|---|---|---|---|
|  | TCHP |  |  |  |  |  |  |  |  |
|  | TOCP |  |  |  |  |  |  |  |  |
|  | TEA |  |  |  |  |  |  |  |  |
|  | TBAC |  |  |  |  |  |  |  |  |
|  | Potassium 2-ethylhexanoate |  |  |  |  |  |  |  |  |
| Epoxy compound [molar ratio] | PGE | 5 | 5 | 5 | 5 | 5 | 5 | 5 | 5 |
|  | BADGE |  |  |  |  |  |  |  |  |
|  | TGIC |  |  |  |  |  |  |  |  |
|  | Styrene oxide |  |  |  |  |  |  |  |  |
|  | CHDADGE |  |  |  |  |  |  |  |  |
| Gel time | Gel time [minutes] | 30 | 30 | 150 | 90 | 90 | 120 | 180 | 120 |
|  | Gel time [evaluation] | A | A | A | A | A | A | A | A |
| Foaming | Foaming [number of bubbles] | 2 | 0 | 4 | 6 | 3 | 3 | 7 | 8 |
|  | Foaming [evaluation] | A | A | A | A | A | A | A | A |

TABLE 4

|  |  | Example 25 | Example 26 | Example 27 | Example 28 | Example 29 | Example 30 | Example 31 | Example 32 |
|---|---|---|---|---|---|---|---|---|---|
| Polyfunctional isocyanate [molar ratio] | MDI | 100 | 100 |  |  |  |  |  |  |
|  | TDI |  |  |  |  |  |  |  |  |
|  | HDI |  |  | 100 | 100 | 100 | 100 | 100 | 100 |
|  | Takenate 600 |  |  |  |  |  |  |  |  |
|  | Coronate HX |  |  |  |  |  |  |  |  |
|  | Duranate D201 |  |  |  |  |  |  |  |  |
| Catalyst [molar ratio] (Compound (I)) | TMPP | 0.1 | 0.1 | 0.1 | 0.1 | 0.1 | 0.1 | 0.1 | 0.1 |
|  | DMPP |  |  |  |  |  |  |  |  |
|  | TOAP |  |  |  |  |  |  |  |  |
|  | TODMAPP |  |  |  |  |  |  |  |  |
| Catalyst [molar ratio] | TPP |  |  |  |  |  |  |  |  |
|  | TOTP |  |  |  |  |  |  |  |  |
|  | TPTP |  |  |  |  |  |  |  |  |
|  | TPAP |  |  |  |  |  |  |  |  |
|  | DPCP |  |  |  |  |  |  |  |  |
|  | TCHP |  |  |  |  |  |  |  |  |
|  | TOCP |  |  |  |  |  |  |  |  |
|  | TEA |  |  |  |  |  |  |  |  |
|  | TBAC |  |  |  |  |  |  |  |  |
|  | Potassium 2-ethylhexanoate |  |  |  |  |  |  |  |  |
| Epoxy compound [molar ratio] | PGE | 1 | 0.2 | 1 | 0.2 |  |  |  |  |
|  | BADGE |  |  |  |  | 5 |  |  |  |
|  | TGIC |  |  |  |  |  | 5 |  |  |
|  | Styrene oxide |  |  |  |  |  |  | 5 |  |
|  | CHDADGE |  |  |  |  |  |  |  | 5 |
| Gel time | Gel time [minutes] | 30 | 60 | 60 | 150 | 30 | 30 | 60 | 30 |
|  | Gel time [evaluation] | A | A | A | A | A | A | A | A |
| Foaming | Foaming [number of bubbles] | 0 | 0 | 0 | 1 | 0 | 0 | 2 | 0 |
|  | Foaming [evaluation] | A | A | A | A | A | A | A | A |

TABLE 5

|  |  | Example 33 | Example 34 | Example 35 | Example 36 | Example 37 | Example 38 | Example 39 | Example 40 |
|---|---|---|---|---|---|---|---|---|---|
| Polyfunctional isocyanate [molar ratio] | MDI | 50 | 50 | 50 | 50 | 50 | 50 | 50 | 50 |
|  | TDI | 50 | 50 |  |  |  |  |  |  |
|  | HDI |  |  | 50 | 50 |  |  |  |  |
|  | Takenate 600 |  |  |  |  | 50 | 50 |  |  |
|  | Coronate HX |  |  |  |  |  |  | 50 | 50 |
|  | Duranate D201 |  |  |  |  |  |  |  |  |
| Catalyst [molar ratio] (Compound (I)) | TMPP | 0.1 |  | 0.1 |  | 0.1 |  | 0.1 |  |
|  | DMPP |  | 0.1 |  | 0.1 |  | 0.1 |  | 0.1 |
|  | TOAP |  |  |  |  |  |  |  |  |
|  | TODMAPP |  |  |  |  |  |  |  |  |
| Catalyst [molar ratio] | TPP |  |  |  |  |  |  |  |  |
|  | TOTP |  |  |  |  |  |  |  |  |
|  | TPTP |  |  |  |  |  |  |  |  |
|  | TPAP |  |  |  |  |  |  |  |  |

TABLE 5-continued

|  |  | Example 33 | Example 34 | Example 35 | Example 36 | Example 37 | Example 38 | Example 39 | Example 40 |
|---|---|---|---|---|---|---|---|---|---|
|  | DPCP |  |  |  |  |  |  |  |  |
|  | TCHP |  |  |  |  |  |  |  |  |
|  | TOCP |  |  |  |  |  |  |  |  |
|  | TEA |  |  |  |  |  |  |  |  |
|  | TBAC |  |  |  |  |  |  |  |  |
|  | Potassium 2-ethylhexanoate |  |  |  |  |  |  |  |  |
| Epoxy compound [molar ratio] | PGE | 5 | 5 | 5 | 5 | 5 | 5 | 5 | 5 |
|  | BADGE |  |  |  |  |  |  |  |  |
|  | TGIC |  |  |  |  |  |  |  |  |
|  | Styrene oxide |  |  |  |  |  |  |  |  |
|  | CHDADGE |  |  |  |  |  |  |  |  |
| Gel time | Gel time [minutes] | 30 | 30 | 30 | 30 | 30 | 60 | 30 | 30 |
|  | Gel time [evaluation] | A | A | A | A | A | A | A | A |
| Foaming | Foaming [number of bubbles] | 0 | 0 | 0 | 1 | 0 | 3 | 0 | 0 |
|  | Foaming [evaluation] | A | A | A | A | A | A | A | A |

TABLE 6

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Polyfunctional isocyanate [molar ratio] | MDI | 100 | 100 | 100 | 100 | 100 | 100 | 100 | 100 | 100 | 100 |
|  | TDI |  |  |  |  |  |  |  |  |  |  |
|  | HDI |  |  |  |  |  |  |  |  |  |  |
|  | Takenate 600 |  |  |  |  |  |  |  |  |  |  |
|  | Coronate HX |  |  |  |  |  |  |  |  |  |  |
|  | Duranate D201 |  |  |  |  |  |  |  |  |  |  |
| Catalyst [molar ratio] (Compound (I)) | TMPP |  |  |  |  |  |  |  |  |  |  |
|  | DMPP |  |  |  |  |  |  |  |  |  |  |
|  | TOAP |  |  |  |  |  |  |  |  |  |  |
|  | TODMAPP |  |  |  |  |  |  |  |  |  |  |
| Catalyst [molar ratio] | TPP | 0.1 |  |  |  |  |  |  |  |  |  |
|  | TOTP |  | 0.1 |  |  |  |  |  |  |  |  |
|  | TPTP |  |  | 0.1 |  |  |  |  |  |  |  |
|  | TPAP |  |  |  | 0.1 |  |  |  |  |  |  |
|  | DPCP |  |  |  |  | 0.1 |  |  |  |  |  |
|  | TCHP |  |  |  |  |  | 0.1 |  |  |  |  |
|  | TOCP |  |  |  |  |  |  | 0.1 |  |  |  |
|  | TEA |  |  |  |  |  |  |  | 0.1 |  |  |
|  | TBAC |  |  |  |  |  |  |  |  | 0.1 |  |
|  | Potassium 2-ethylhexanoate |  |  |  |  |  |  |  |  |  | 0.1 |
| Epoxy compound [molar ratio] | PGE | 5 | 5 | 5 | 5 | 5 | 5 | 5 | 5 | 5 | 5 |
|  | BADGE |  |  |  |  |  |  |  |  |  |  |
|  | TGIC |  |  |  |  |  |  |  |  |  |  |
|  | Styrene oxide |  |  |  |  |  |  |  |  |  |  |
|  | CHDADGE |  |  |  |  |  |  |  |  |  |  |
| Gel time | Gel time [minutes] | at least 360 | at least 360 | at least 360 | at least 360 | at least 360 | at least 360 | at least 360 | 30 | 60 | 30 |
|  | Gel time [evaluation] | B | B | B | B | B | B | B | A | A | A |
| Foaming | Foaming [number of bubbles] | — | — | — | — | — | — | — | 19 | 32 | at least 50 |
|  | Foaming [evaluation] | — | — | — | — | — | — | — | B | B | B |

TABLE 7

|  |  | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| Polyfunctional isocyanate [molar ratio] | MDI |  |  |  |  |  |  |  |  |  |  |
|  | TDI | 100 | 100 | 100 | 100 | 100 | 100 | 100 | 100 | 100 | 100 |
|  | HDI |  |  |  |  |  |  |  |  |  |  |
|  | Takenate 600 |  |  |  |  |  |  |  |  |  |  |
|  | Coronate HX |  |  |  |  |  |  |  |  |  |  |
|  | Duranate D201 |  |  |  |  |  |  |  |  |  |  |

TABLE 7-continued

|  |  | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| Catalyst [molar ratio] (Compound (I)) | TMPP |  |  |  |  |  |  |  |  |  |  |
|  | DMPP |  |  |  |  |  |  |  |  |  |  |
|  | TOAP |  |  |  |  |  |  |  |  |  |  |
|  | TODMAPP |  |  |  |  |  |  |  |  |  |  |
| Catalyst [molar ratio] | TPP | 0.1 |  |  |  |  |  |  |  |  |  |
|  | TOTP |  | 0.1 |  |  |  |  |  |  |  |  |
|  | TPTP |  |  | 0.1 |  |  |  |  |  |  |  |
|  | TPAP |  |  |  | 0.1 |  |  |  |  |  |  |
|  | DPCP |  |  |  |  | 0.1 |  |  |  |  |  |
|  | TCHP |  |  |  |  |  | 0.1 |  |  |  |  |
|  | TOCP |  |  |  |  |  |  | 0.1 |  |  |  |
|  | TEA |  |  |  |  |  |  |  | 0.1 |  |  |
|  | TBAC |  |  |  |  |  |  |  |  | 0.1 |  |
|  | Potassium 2-ethylhexanoate |  |  |  |  |  |  |  |  |  | 0.1 |
| Epoxy compound [molar ratio] | PGE | 5 | 5 | 5 | 5 | 5 | 5 | 5 | 5 | 5 | 5 |
|  | BADGE |  |  |  |  |  |  |  |  |  |  |
|  | TGIC |  |  |  |  |  |  |  |  |  |  |
|  | Styrene oxide |  |  |  |  |  |  |  |  |  |  |
|  | CHDADGE |  |  |  |  |  |  |  |  |  |  |
| Gel time | Gel time [minutes] | at least 360 | at least 360 | at least 360 | at least 360 | at least 360 | at least 360 | at least 360 | 30 | 60 | 30 |
|  | Gel time [evaluation] | B | B | B | B | B | B | B | A | A | A |
| Foaming | Foaming [number of bubbles] | — | — | — | — | — | — | — | 17 | 21 | at least 50 |
|  | Foaming [evaluation] | — | — | — | — | — | — | — | B | B | B |

TABLE 8

|  |  | Comparative Example 21 | Comparative Example 22 | Comparative Example 23 | Comparative Example 24 | Comparative Example 25 | Comparative Example 26 | Comparative Example 27 | Comparative Example 28 | Comparative Example 29 | Comparative Example 30 |
|---|---|---|---|---|---|---|---|---|---|---|---|
| Polyfunctional isocyanate [molar ratio] | MDI |  |  |  |  |  |  |  |  |  |  |
|  | TDI |  |  |  |  |  |  |  |  |  |  |
|  | HDI | 100 | 100 | 100 | 100 | 100 | 100 | 100 | 100 | 100 | 100 |
|  | Takenate 600 |  |  |  |  |  |  |  |  |  |  |
|  | Coronate HX |  |  |  |  |  |  |  |  |  |  |
|  | Duranate D201 |  |  |  |  |  |  |  |  |  |  |
| Catalyst [molar ratio] (Compound (I)) | TMPP |  |  |  |  |  |  |  |  |  |  |
|  | DMPP |  |  |  |  |  |  |  |  |  |  |
|  | TOAP |  |  |  |  |  |  |  |  |  |  |
|  | TODMAPP |  |  |  |  |  |  |  |  |  |  |
| Catalyst [molar ratio] | TPP | 0.1 |  |  |  |  |  |  |  |  |  |
|  | TOTP |  | 0.1 |  |  |  |  |  |  |  |  |
|  | TPTP |  |  | 0.1 |  |  |  |  |  |  |  |
|  | TPAP |  |  |  | 0.1 |  |  |  |  |  |  |
|  | DPCP |  |  |  |  | 0.1 |  |  |  |  |  |
|  | TCHP |  |  |  |  |  | 0.1 |  |  |  |  |
|  | TOCP |  |  |  |  |  |  | 0.1 |  |  |  |
|  | TEA |  |  |  |  |  |  |  | 0.1 |  |  |
|  | TBAC |  |  |  |  |  |  |  |  | 0.1 |  |
|  | Potassium 2-ethylhexanoate |  |  |  |  |  |  |  |  |  | 0.1 |
| Epoxy compound [molar ratio] | PGE | 5 | 5 | 5 | 5 | 5 | 5 | 5 | 5 | 5 | 5 |
|  | BADGE |  |  |  |  |  |  |  |  |  |  |
|  | TGIC |  |  |  |  |  |  |  |  |  |  |
|  | Styrene oxide |  |  |  |  |  |  |  |  |  |  |
|  | CHDADGE |  |  |  |  |  |  |  |  |  |  |
| Gel time | Gel time [minutes] | at least 360 | at least 360 | at least 360 | at least 360 | at least 360 | at least 360 | at least 360 | at least 360 | 60 | 30 |
|  | Gel time [evaluation] | B | B | B | B | B | B | B | B | A | A |
| Foaming | Foaming [number of bubbles] | — | — | — | — | — | — | — | — | 26 | at least 50 |
|  | Foaming [evaluation] | — | — | — | — | — | — | — | — | B | B |

TABLE 9

|  |  | Comparative Example 31 | Comparative Example 32 | Comparative Example 33 | Comparative Example 34 | Comparative Example 35 | Comparative Example 36 | Comparative Example 37 | Comparative Example 38 | Comparative Example 39 | Comparative Example 40 |
|---|---|---|---|---|---|---|---|---|---|---|---|
| Polyfunctional isocyanate [molar ratio] | MDI | | | | | | | | | | |
| | TDI | | | | | | | | | | |
| | HDI | | | | | | | | | | |
| | Takenate 600 | 100 | 100 | 100 | 100 | 100 | 100 | 100 | 100 | 100 | 100 |
| | Coronate HX | | | | | | | | | | |
| | Duranate D201 | | | | | | | | | | |
| Catalyst [molar ratio] (Compound (I)) | TMPP | | | | | | | | | | |
| | DMPP | | | | | | | | | | |
| | TOAP | | | | | | | | | | |
| | TODMAPP | | | | | | | | | | |
| Catalyst [molar ratio] | TPP | 0.1 | | | | | | | | | |
| | TOTP | | 0.1 | | | | | | | | |
| | TPTP | | | 0.1 | | | | | | | |
| | TPAP | | | | 0.1 | | | | | | |
| | DPCP | | | | | 0.1 | | | | | |
| | TCHP | | | | | | 0.1 | | | | |
| | TOCP | | | | | | | 0.1 | | | |
| | TEA | | | | | | | | 0.1 | | |
| | TBAC | | | | | | | | | 0.1 | |
| | Potassium 2-ethylhexanoate | | | | | | | | | | 0.1 |
| Epoxy compound [molar ratio] | PGE | 5 | 5 | 5 | 5 | 5 | 5 | 5 | 5 | 5 | 5 |
| | BADGE | | | | | | | | | | |
| | TGIC | | | | | | | | | | |
| | Styrene oxide | | | | | | | | | | |
| | CHDADGE | | | | | | | | | | |
| Gel time | Gel time [minutes] | at least 360 | at least 360 | at least 360 | at least 360 | at least 360 | at least 360 | at least 360 | at least 360 | 30 | 30 |
| | Gel time [evaluation] | B | B | B | B | B | B | B | B | A | A |
| Foaming | Foaming [number of bubbles] | — | — | — | — | — | — | — | — | 22 | at least 50 |
| | Foaming [evaluation] | — | — | — | — | — | — | — | — | B | B |

TABLE 10

|  |  | Comparative Example 41 | Comparative Example 42 | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|---|---|
| Polyfunctional isocyanate [molar ratio] | MDI | | | | | | | | | | |
| | TDI | | | | | | | | | | |
| | HDI | | | | | | | | | | |
| | Takenate 600 | | | | | | | | | | |
| | Coronate HX | 100 | 100 | 100 | 100 | 100 | 100 | 100 | 100 | 100 | 100 |
| | Duranate D201 | | | | | | | | | | |
| Catalyst [molar ratio] (Compound (I)) | TMPP | | | | | | | | | | |
| | DMPP | | | | | | | | | | |
| | TOAP | | | | | | | | | | |
| | TODMAPP | | | | | | | | | | |
| Catalyst [molar ratio] | TPP | 0.1 | | | | | | | | | |
| | TOTP | | 0.1 | | | | | | | | |
| | TPTP | | | 0.1 | | | | | | | |
| | TPAP | | | | 0.1 | | | | | | |
| | DPCP | | | | | 0.1 | | | | | |
| | TCHP | | | | | | 0.1 | | | | |
| | TOCP | | | | | | | 0.1 | | | |
| | TEA | | | | | | | | 0.1 | | |
| | TBAC | | | | | | | | | 0.1 | |
| | Potassium 2-ethylhexanoate | | | | | | | | | | 0.1 |
| Epoxy compound [molar ratio] | PGE | 5 | 5 | 5 | 5 | 5 | 5 | 5 | 5 | 5 | 5 |
| | BADGE | | | | | | | | | | |
| | TGIC | | | | | | | | | | |
| | Styrene oxide | | | | | | | | | | |
| | CHDADGE | | | | | | | | | | |

TABLE 10-continued

|  |  | Comparative Example 41 | Comparative Example 42 | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|---|---|
| Gel time | Gel time [minutes] | at least 360 | at least 360 | at least 360 | at least 360 | at least 360 | at least 360 | at least 360 | at least 360 | 30 | 30 |
|  | Gel time [evaluation] | B | B | B | B | B | B | B | B | A | A |
| Foaming | Foaming [number of bubbles] | — | — | — | — | — | — | — | — | 29 | at least 50 |
|  | Foaming [evaluation] | — | — | — | — | — | — | — | — | B | B |

TABLE 11

|  |  | Comparative Example 51 | Comparative Example 52 | Comparative Example 53 | Comparative Example 54 | Comparative Example 55 | Comparative Example 56 | Comparative Example 57 | Comparative Example 58 | Comparative Example 59 | Comparative Example 60 |
|---|---|---|---|---|---|---|---|---|---|---|---|
| Polyfunctional isocyanate [molar ratio] | MDI |  |  |  |  |  |  |  |  |  |  |
|  | TDI |  |  |  |  |  |  |  |  |  |  |
|  | HDI |  |  |  |  |  |  |  |  |  |  |
|  | Takenate 600 |  |  |  |  |  |  |  |  |  |  |
|  | Coronate HX |  |  |  |  |  |  |  |  |  |  |
|  | Duranate D201 | 100 | 100 | 100 | 100 | 100 | 100 | 100 | 100 | 100 | 100 |
| Catalyst [molar ratio] (Compound (I)) | TMPP |  |  |  |  |  |  |  |  |  |  |
|  | DMPP |  |  |  |  |  |  |  |  |  |  |
|  | TOAP |  |  |  |  |  |  |  |  |  |  |
|  | TODMAPP |  |  |  |  |  |  |  |  |  |  |
| Catalyst [molar ratio] | TPP | 0.1 |  |  |  |  |  |  |  |  |  |
|  | TOTP |  | 0.1 |  |  |  |  |  |  |  |  |
|  | TPTP |  |  | 0.1 |  |  |  |  |  |  |  |
|  | TPAP |  |  |  | 0.1 |  |  |  |  |  |  |
|  | DPCP |  |  |  |  | 0.1 |  |  |  |  |  |
|  | TCHP |  |  |  |  |  | 0.1 |  |  |  |  |
|  | TOCP |  |  |  |  |  |  | 0.1 |  |  |  |
|  | TEA |  |  |  |  |  |  |  | 0.1 |  |  |
|  | TBAC |  |  |  |  |  |  |  |  | 0.1 |  |
|  | Potassium 2-ethylhexanoate |  |  |  |  |  |  |  |  |  | 0.1 |
| Epoxy compound [molar ratio] | PGE | 5 | 5 | 5 | 5 | 5 | 5 | 5 | 5 | 5 | 5 |
|  | BADGE |  |  |  |  |  |  |  |  |  |  |
|  | TGIC |  |  |  |  |  |  |  |  |  |  |
|  | Styrene oxide |  |  |  |  |  |  |  |  |  |  |
|  | CHDADGE |  |  |  |  |  |  |  |  |  |  |
| Gel time | Gel time [minutes] | at least 360 | at least 360 | at least 360 | at least 360 | at least 360 | at least 360 | at least 360 | 90 | 30 | 30 |
|  | Gel time [evaluation] | B | B | B | B | B | B | B | A | A | A |
| Foaming | Foaming [number of bubbles] | — | — | — | — | — | — | — | 26 | 32 | at least 50 |
|  | Foaming [evaluation] | — | — | — | — | — | — | — | B | B | B |

TABLE 12

|  |  | Comparative Example 61 | Comparative Example 62 | Comparative Example 63 | Comparative Example 64 | Comparative Example 65 | Comparative Example 66 | Comparative Example 67 | Comparative Example 68 | Comparative Example 69 |
|---|---|---|---|---|---|---|---|---|---|---|
| Polyfunctional isocyanate [molar ratio] | MDI | 100 | 100 | 100 | 100 |  |  |  |  |  |
|  | TDI |  |  |  |  | 100 |  |  |  |  |
|  | HDI |  |  |  |  |  | 100 |  |  |  |
|  | Takenate 600 |  |  |  |  |  |  | 100 |  |  |
|  | Coronate HX |  |  |  |  |  |  |  | 100 |  |
|  | Duranate D201 |  |  |  |  |  |  |  |  | 100 |
| Catalyst [molar ratio] (Compound (I)) | TMPP | 0.1 |  |  |  | 0.1 | 0.1 | 0.1 | 0.1 | 0.1 |
|  | DMPP |  | 0.1 |  |  |  |  |  |  |  |
|  | TOAP |  |  | 0.1 |  |  |  |  |  |  |
|  | TODMAPP |  |  |  | 0.1 |  |  |  |  |  |

TABLE 12-continued

| | | Comparative Example 61 | Comparative Example 62 | Comparative Example 63 | Comparative Example 64 | Comparative Example 65 | Comparative Example 66 | Comparative Example 67 | Comparative Example 68 | Comparative Example 69 |
|---|---|---|---|---|---|---|---|---|---|---|
| Catalyst [molar ratio] | TPP | | | | | | | | | |
| | TOTP | | | | | | | | | |
| | TPTP | | | | | | | | | |
| | TPAP | | | | | | | | | |
| | DPCP | | | | | | | | | |
| | TCHP | | | | | | | | | |
| | TOCP | | | | | | | | | |
| | TEA | | | | | | | | | |
| | TBAC | | | | | | | | | |
| | Potassium 2-ethylhexanoate | | | | | | | | | |
| Epoxy compound [molar ratio] | PGE | | | | | | | | | |
| | BADGE | | | | | | | | | |
| | TGIC | | | | | | | | | |
| | Styrene oxide | | | | | | | | | |
| | CHDADGE | | | | | | | | | |
| Gel time | Gel time [minutes] | at least 360 | at least 360 | at least 360 | at least 360 | at least 360 | at least 360 | at least 360 | at least 360 | at least 360 |
| | Gel time [evaluation] | B | B | B | B | B | B | B | B | B |
| Foaming | Foaming [number of bubbles] | — | — | — | — | — | — | — | — | — |
| | Foaming [evaluation] | — | — | — | — | — | — | — | — | — |

The abbreviations used for the compounds in Tables 1 to 12 indicate the compounds shown below in Table 13.

TABLE 13

| | | Compound name | Product name | Distributor |
|---|---|---|---|---|
| Polyfunctional isocyanate | MDI | diphenylmethane diisocyanate | at left | Tokyo Chemical Industry Co., Ltd. |
| | TDI | tolylene diisocyanate | at left | Tokyo Chemical Industry Co., Ltd. |
| | HDI | hexamethylene diisocyanate | at left | Tokyo Chemical Industry Co., Ltd. |
| | Takenate 600 | bis(isocyanatomethyl)cyclohexane | Takenate 600 | Mitsui Chemicals, Inc. |
| | Coronate HX | — | Coronate HX | Tosoh Corporation |
| | Duranate D201 | — | Duranate D201 | Asahi Kasei Corporation |
| Catalyst (Compound (I)) | TMPP | tris(2,4,6-trimethoxphenyl)phosphine | at left | Sigma-Aldrich Corporation |
| | DMPP | tris(2,6-dimethoxyphenyl)phosphine | at left | Tokyo Chemical Industry Co., Ltd. |
| | TOAP | tris(ortho-methoxyphenyl)phosphine | at left | Tokyo Chemical Industry Co., Ltd. |
| | TODMAPP | tris(ortho-dimethylaminophenyl)phosphine | — | Synthesized using the method disclosed in J. Chem. Soc. 1965, 0, 5210 to 5216 |
| Catalyst | TPP | triphenylphosphine | at left | Tokyo Chemical Industry Co., Ltd. |
| | TOTP | tri(ortho-tolyl)phosphine | at left | Tokyo Chemical Industry Co., Ltd. |
| | TPTP | tris(para-tolyl)phosphine | TPTP | Hokko Chemical Industry Co., Ltd. |
| | TPAP | tris(para-methoxyphenyl)phosphine | TPAP | Hokko Chemical Industry Co., Ltd. |
| | DPCP | diphenylcyclohexylphosphine | DPCP | Hokko Chemical Industry Co., Ltd. |
| | TCHP | tricyclohexylphosphine | at left | Tokyo Chemical Industry Co., Ltd. |
| | TOCP | tri-n-octylphosphine | TOCP | Hokko Chemical Industry Co., Ltd. |
| | TEA | triethylamine | at left | Tokyo Chemical Industry Co., Ltd. |
| | TBAC | tetrabutylammonium chloride | at left | Tokyo Chemical Industry Co., Ltd. |
| | Potassium 2-ethylhexanoate | potassium 2-ethylhexanoate | at left | Tokyo Chemical Industry Co., Ltd. |
| Epoxy compound | PGE | phenyl glycidyl ether | at left | Tokyo Chemical Industry Co., Ltd. |
| | BADGE | bisphenol A diglycidyl ether | at left | Tokyo Chemical Industry Co., Ltd. |
| | TGIC | triglycidyl isocyanmate | at left | Tokyo Chemical Industry Co., Ltd. |
| | Styrene oxide | styrene oxide | at left | Tokyo Chemical Industry Co., Ltd. |
| | CHDADGE | diglycidyl 1,2-cyclohexanedicarboxylate | at left | Tokyo Chemical Industry Co., Ltd. |

In Examples 1 to 40, favorable results were obtained for both the gel time and the foaming.

In contrast, in Comparative Examples 1 to 69, either the gel time was long, with curing not occurring within 360 minutes, meaning a polyisocyanurate raw material cured product was not obtained, or in those cases where a polyisocyanurate raw material cured product was obtained, large amounts of foaming were observed. Comparative Examples 61 to 69 represent examples in which the compound (I) was used as a catalyst but an epoxy compound was not used, but the gel time was long, and a polyisocyanurate raw material cured product could not be obtained.

These results confirmed that in Examples 1 to 40, foaming during heat curing was suppressed, and favorable curability was achieved. Further, the results in Table 12 (Comparative Examples 61 to 69) confirmed that an epoxy compound is necessary for the polyisocyanurate production reaction to proceed satisfactorily.

[Evaluation of Phosphorus Catalysts]

For the phosphorus catalysts TMPP, DMPP, TOAP, TPP, TOTP, TPTP, TPAP, DPCP, TCHP, TOCP, DPPP and DPPST, quantum chemical calculations were performed based on the density functional method and the B3LYP/6-31G* method. The HOMO level that mirrors the unshared electron pair on the phosphorus atom was calculated. The structural formulas of the above catalysts are shown below. The results of the quantum chemical calculations are shown in Table 14.

[Chemical formula 20]

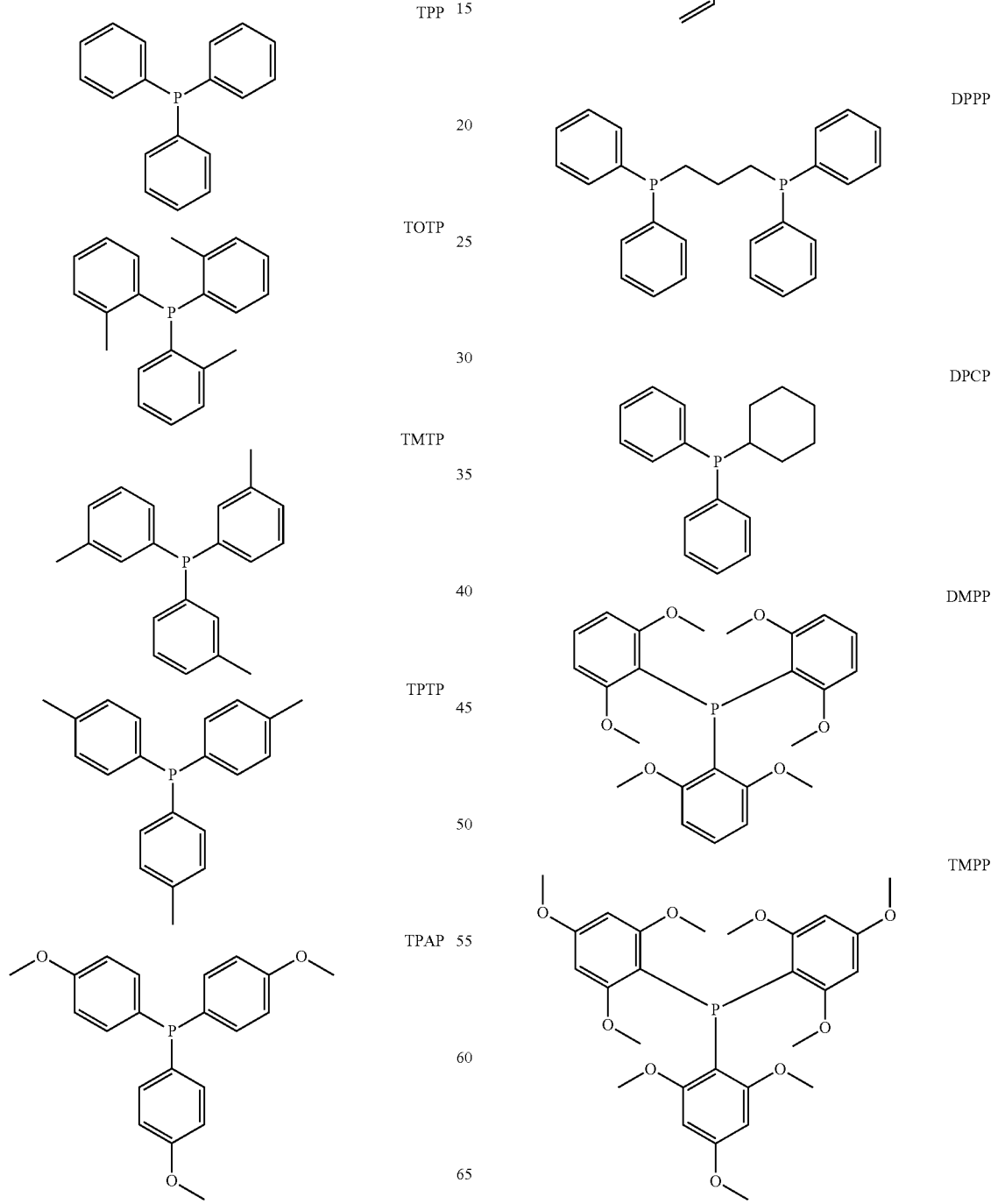

-continued

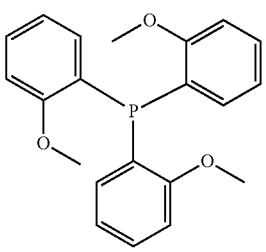

TOAP

TABLE 14

| Phosphorus catalyst No. | Type of molecule | HOMO/a.u. | Gel time (min) |
|---|---|---|---|
| 1 | TPP | −0.211 | at least 360 |
| 2 | TOTP | −0.205 | at least 360 |
| 3 | TMTP | −0.207 | at least 360 |
| 4 | TPTP | −0.204 | at least 360 |
| 5 | TPAP | −0.193 | at least 360 |
| 6 | DPPST | −0.208 | at least 360 |
| 7 | DPPP | −0.214 | at least 360 |
| 8 | DPCP | −0.205 | at least 360 |
| 9 | DMPP | −0.174 | 30 |
| 10 | TMPP | −0.162 | 30 |
| 11 | TOAP | −0.190 | 150 |

Hexamethylene diisocyanate, each catalyst (catalyst Nos. 1 to 11) and phenyl glycidyl ether were blended in a molar ratio of 100:0.1:5, and the results of evaluating the gel time of each mixture using the method described above are shown in Table 14. Phosphorus catalyst Nos. 9 to 11, which had favorable gel times, exhibited HOMO levels of −0.190 a.u. or higher. Among these catalysts, phosphorus catalyst Nos. 9 to 10 which had a shorter gel time than phosphorus catalyst No. 11 also had a higher HOMO level than No. 11. On the other hand, phosphorus catalyst Nos. 1 to 8 which had long gel times and did not cure within 360 minutes exhibited HOMO levels lower than −0.190 a.u. Accordingly, it was evident that the HOMO level could be used as a first indicator for screening polyisocyanurate production reaction catalysts having a high reaction rate.

The phosphorus catalyst No. 5 and the phosphorus catalyst No. 11 are phosphorus catalysts in which a methoxy group substituent is bonded to the para-position or ortho-positions respectively of each benzene ring. Although both catalysts have a similar HOMO levels, a large difference was observed in the reaction times. In order to investigate the reasons behind this difference, a transition state measurement was conducted based on the B3LYP/6-31+G* method of the density functional theory, and the activation barrier to nucleophilic attack of the phosphorus catalyst on the co-catalyst 1,2-ethyloxirane (an epoxy compound) was calculated. In order to take the solvent effect into consideration, a continuum model (PCM) calculation was performed including the dielectric constant and the solvation radius for chlorobenzene. The activation energy for the phosphorus catalyst No. 5 was 33.79 kcal/mol, whereas the activation energy for the phosphorus catalyst No. 11 was 32.17 kcal/mol. Accordingly, the activation barrier for the phosphorus catalyst No. 11 was smaller than that for the phosphorus catalyst No. 5, which coincided with the test results (see Tables 1 to 12 and Table 14) that indicated better progression of the reaction.

As a result of observing the structures in the above transition state measurements of the phosphorus catalyst No. 5 and the phosphorus catalyst No. 11, it was evident that hydrogen bonding occurs between the hydrogen atoms of the 1,2-ethyloxirane and the oxygen atoms at the ortho-positions of the phosphorus catalyst, thereby drawing the 1,2-oxirane toward the catalyst molecule, and as a result, the distance between the phosphorus atom and the carbon atom of the 1,2-ethyloxirane that represents the reaction points shortens. Further, it was also evident that in order to achieve a three-dimensional interaction between the 1,2-ethyloxirane and the oxygen atoms of the methoxy groups of the phosphorus catalyst, the atoms of the substituents bonded directly to the ortho-position carbons relative to the phosphorus atom must be electrically negative. Calculation of the average value of the Mulliken charge of the substituent atom bonded directly to the carbon atom at the ortho-position relative to the phosphorus atom (namely, the average charge of the ortho-position) revealed an average charge of 0.1435 for the ortho-position of the phosphorus catalyst No. 5, and an average charge of −0.1805 for the ortho-position of the phosphorus catalyst No. 11, confirming that the phosphorus catalyst No. 11 was electrically more negative.

Based on the above results, it was evident that ensuring that the substituent atom bonded directly to the carbon atom at the ortho-position relative to the phosphorus atom was electrically negative could be used as a second indicator for screening polyisocyanurate production reaction catalysts having a high reaction rate.

Here, the expression "average charge of the ortho-position" represents the average value of the Mulliken charges of those atoms, within the substituents bonded to the ortho-positions of the three cyclic molecules bonded directly to the phosphorus atom, that are bonded directly to the carbon atoms. For example, in the case of the above phosphorus catalyst No. 1 (TPP), the corresponding atoms are the hydrogen atoms bonded to the carbon atoms on both sides of the carbon atoms bonded to the phosphorus atom. Because there are three benzene rings bonded to the phosphorus atom, there are 6 corresponding atoms. The average of the Mulliken charges of these 6 atoms is defined as the "average charge of the ortho-position".

The average charge of the ortho-position was calculated for the above phosphorus catalysts Nos. 1 to 11, and the results are shown in Table 15 together with the HOMO levels.

TABLE 15

| Phosphorus catalyst No. | Type of molecule | HOMO/a.u. | Average charge of ortho-position |
|---|---|---|---|
| 1 | TPP | −0.211 | 0.1445 |
| 2 | TOTP | −0.205 | −0.1985 |
| 3 | TMTP | −0.207 | 0.139 |
| 4 | TPTP | −0.204 | 0.142 |
| 5 | TPAP | −0.193 | 0.1435 |
| 6 | DPPST | −0.208 | 0.145 |
| 7 | DPPP | −0.214 | 0.145 |
| 8 | DPCP | −0.205 | 0.140 |
| 9 | DMPP | −0.174 | −0.499 |
| 10 | TMPP | −0.162 | −0.503 |
| 11 | TOAP | −0.190 | −0.1805 |

For the phosphorus catalysts shown above in Table 15, the regions in which the catalysts of high reactivity exist were investigated, with the HOMO level plotted along the horizontal axis (x axis) and the average charge of the ortho-position plotted along the vertical axis (y axis). The results are shown in FIG. 1. In FIG. 1, the number labeling each plot point represents the phosphorus catalyst No. shown in Table 15. As illustrated in FIG. 1, it was discovered that the phosphorus catalysts that exhibited favorable curability in the evaluation tests of the above polyisocyanurate raw material composition (namely, the catalysts used in Examples 1 to 40; phosphorus catalyst Nos. 9 to 11: shown as black circles) were positioned in a region represented by y<28.5x+5.644 (wherein x represents the HOMO level/a.u.), and y represents the average charge of the ortho-position). Accordingly, it was clear that provided the phosphorus catalyst satisfies the condition represented by formula (1) below, the polyisocyanurate production reaction proceeds favorably, and the catalyst could be used favorably as a catalyst for the polyisocyanurate production reaction.

$$y<28.5x+5.644 \quad (1)$$

x: Homo level/a.u.
y: average charge of ortho-position

The HOMO level and average charge of the ortho-position were calculated for the other phosphorus catalysts to search for phosphorus catalysts that satisfied the condition represented by formula (1). The results revealed that the phosphorus catalysts Nos. 12 to 170 shown in Tables 16 to 21 satisfied the condition of formula (1). In Tables 16 to 21, $R^1$ to $R^5$, $R^{11}$ to $R^{15}$, and $R^{21}$ to $R^{25}$ represent the substituents represented by $R^1$ to $R^5$, $R^{11}$ to $R^{15}$, and $R^{21}$ to $R^{25}$ in the following general formula, "H" represents a hydrogen atom, "OMe" represents a methoxy group, "NHMe" represents a monomethylamino group, and "NMe2" represents a dimethylamino group.

[Chemical formula 21]

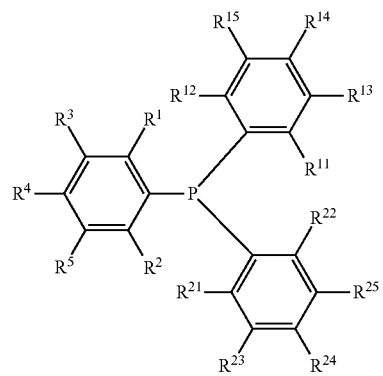

TABLE 16

| Phosphorus catalyst No. | HOMO level | Average charge of ortho-position | $R^1$ | $R^2$ | $R^3$ | $R^4$ | $R^5$ | $R^{11}$ | $R^{12}$ |
|---|---|---|---|---|---|---|---|---|---|
| 12 | −0.173 | −0.65167 | NHMe | NHMe | H | H | H | NHMe | NHMe |
| 13 | −0.16 | −0.44033 | NMe2 | NMe2 | H | H | H | NMe2 | NMe2 |
| 14 | −0.171 | −0.58 | OMe | NHMe | H | H | H | OMe | NHMe |
| 15 | −0.164 | −0.47083 | OMe | NMe2 | H | H | H | OMe | NMe2 |
| 16 | −0.164 | −0.55067 | NHMe | NMe2 | H | H | H | NHMe | NMe2 |
| 17 | −0.193 | −0.18217 | OMe | H | OMe | H | H | OMe | H |
| 18 | −0.181 | −0.254 | NHMe | H | NHMe | H | H | NHMe | H |
| 19 | −0.176 | −0.15617 | NMe2 | H | NMe2 | H | H | NMe2 | H |
| 20 | −0.187 | −0.1935 | OMe | H | NHMe | H | H | OMe | H |
| 21 | −0.189 | −0.187 | OMe | H | NMe2 | H | H | OMe | H |
| 22 | −0.17 | −0.1505 | NMe2 | H | OMe | H | H | NMe2 | H |
| 23 | −0.173 | −0.24483 | NHMe | H | OMe | H | H | NHMe | H |
| 24 | −0.172 | −0.24367 | NHMe | H | NMe2 | H | H | NHMe | H |
| 25 | −0.178 | −0.1705 | NMe2 | H | NHMe | H | H | NMe2 | H |
| 26 | −0.153 | −0.443 | NMe2 | NMe2 | H | OMe | H | NMe2 | NMe2 |
| 27 | −0.168 | −0.6565 | NHMe | NHMe | H | OMe | H | NHMe | NHMe |
| 28 | −0.157 | −0.5525 | NHMe | NMe2 | H | OMe | H | NHMe | NMe2 |
| 29 | −0.153 | −0.46767 | OMe | NMe2 | H | OMe | H | OMe | NMe2 |
| 30 | −0.167 | −0.571 | OMe | NHMe | H | OMe | H | OMe | NHMe |
| 31 | −0.148 | −0.50133 | OMe | OMe | H | NHMe | H | OMe | OMe |
| 32 | −0.153 | −0.66167 | NHMe | NHMe | H | NHMe | H | NHMe | NHMe |
| 33 | −0.144 | −0.46717 | OMe | NMe2 | H | NHMe | H | OMe | NMe2 |
| 34 | −0.152 | −0.5795 | OMe | NHMe | H | NHMe | H | OMe | NHMe |
| 35 | −0.146 | −0.5025 | OMe | OMe | H | NMe2 | H | OMe | OMe |
| 36 | −0.14 | −0.437 | NMe2 | NMe2 | H | NMe2 | H | NMe2 | NMe2 |
| 37 | −0.151 | −0.66183 | NHMe | NHMe | H | NMe2 | H | NHMe | NHMe |
| 38 | −0.145 | −0.5475 | NHMe | NMe2 | H | NMe2 | H | NHMe | NMe2 |
| 39 | −0.144 | −0.467 | OMe | NMe2 | H | NMe2 | H | OMe | NMe2 |
| 40 | −0.148 | −0.58417 | OMe | NHMe | H | NMe2 | H | OMe | NHMe |

| Phosphorus catalyst No. | $R^{13}$ | $R^{14}$ | $R^{15}$ | $R^{21}$ | $R^{22}$ | $R^{23}$ | $R^{24}$ | $R^{25}$ |
|---|---|---|---|---|---|---|---|---|
| 12 | H | H | H | NHMe | NHMe | H | H | H |
| 13 | H | H | H | NMe2 | NMe2 | H | H | H |
| 14 | H | H | H | OMe | NHMe | H | H | H |
| 15 | H | H | H | OMe | NMe2 | H | H | H |
| 16 | H | H | H | NHMe | NMe2 | H | H | H |
| 17 | OMe | H | H | OMe | H | OMe | H | H |
| 18 | NHMe | H | H | NHMe | H | NHMe | H | H |
| 19 | NMe2 | H | H | NMe2 | H | NMe2 | H | H |
| 20 | NHMe | H | H | OMe | H | NHMe | H | H |
| 21 | NMe2 | H | H | OMe | H | NMe2 | H | H |
| 22 | OMe | H | H | NMe2 | H | OMe | H | H |

TABLE 16-continued

| | | | | | | | | |
|---|---|---|---|---|---|---|---|---|
| 23 | OMe | H | H | NHMe | H | OMe | H | H |
| 24 | NMe2 | H | H | NHMe | H | NMe2 | H | H |
| 25 | NHMe | H | H | NMe2 | H | NHMe | H | H |
| 26 | H | OMe | H | NMe2 | NMe2 | H | OMe | H |
| 27 | H | OMe | H | NHMe | NHMe | H | OMe | H |
| 28 | H | OMe | H | NHMe | NMe2 | H | OMe | H |
| 29 | H | OMe | H | OMe | NMe2 | H | OMe | H |
| 30 | H | OMe | H | OMe | NHMe | H | OMe | H |
| 31 | H | NHMe | H | OMe | OMe | H | NHMe | H |
| 32 | H | NHMe | H | NHMe | NHMe | H | NHMe | H |
| 33 | H | NHMe | H | OMe | NMe2 | H | NHMe | H |
| 34 | H | NHMe | H | OMe | NHMe | H | NHMe | H |
| 35 | H | NMe2 | H | OMe | OMe | H | NMe2 | H |
| 36 | H | NMe2 | H | NMe2 | NMe2 | H | NMe2 | H |
| 37 | H | NMe2 | H | NHMe | NHMe | H | NMe2 | H |
| 38 | H | NMe2 | H | NHMe | NMe2 | H | NMe2 | H |
| 39 | H | NMe2 | H | OMe | NMe2 | H | NMe2 | H |
| 40 | H | NMe2 | H | OMe | NHMe | H | NMe2 | H |

TABLE 17

| Phosphorus catalyst No. | HOMO level | Average charge of ortho-position | $R^1$ | $R^2$ | $R^3$ | $R^4$ | $R^5$ | $R^{11}$ | $R^{12}$ |
|---|---|---|---|---|---|---|---|---|---|
| 41 | −0.185 | −0.189 | OMe | H | OMe | OMe | H | OMe | H |
| 42 | −0.167 | −0.14833 | NMe2 | H | NMe2 | OMe | H | NMe2 | H |
| 43 | −0.181 | −0.26083 | NHMe | H | NHMe | OMe | H | NHMe | H |
| 44 | −0.177 | −0.26 | NHMe | H | NMe2 | OMe | H | NHMe | H |
| 45 | −0.18 | −0.19167 | OMe | H | NMe2 | OMe | H | OMe | H |
| 46 | −0.177 | −0.19683 | OMe | H | NHMe | OMe | H | OMe | H |
| 47 | −0.167 | −0.19233 | OMe | H | OMe | NHMe | H | OMe | H |
| 48 | −0.155 | −0.14867 | NMe2 | H | NMe2 | NHMe | H | NMe2 | H |
| 49 | −0.167 | −0.26783 | NHMe | H | NHMe | NHMe | H | NHMe | H |
| 50 | −0.163 | −0.267 | NHMe | H | NMe2 | NHMe | H | NHMe | H |
| 51 | −0.162 | −0.19483 | OMe | H | NMe2 | NHMe | H | OMe | H |
| 52 | −0.167 | −0.2 | OMe | H | NHMe | NHMe | H | OMe | H |
| 53 | −0.174 | −0.19067 | OMe | H | OMe | NMe2 | H | OMe | H |
| 54 | −0.173 | −0.14867 | NMe2 | H | NMe2 | NMe2 | H | NMe2 | H |
| 55 | −0.17 | −0.26617 | NHMe | H | NHMe | NMe2 | H | NHMe | H |
| 56 | −0.175 | −0.266 | NHMe | H | NMe2 | NMe2 | H | NHMe | H |
| 57 | −0.167 | −0.19433 | OMe | H | NMe2 | NMe2 | H | OMe | H |
| 58 | −0.171 | −0.20067 | OMe | H | NHMe | NMe2 | H | OMe | H |
| 59 | −0.163 | −0.5105 | OMe | OMe | OMe | OMe | H | OMe | OMe |
| 60 | −0.156 | −0.52167 | OMe | OMe | NHMe | OMe | H | OMe | OMe |
| 61 | −0.162 | −0.5095 | OMe | OMe | NMe2 | OMe | H | OMe | OMe |
| 62 | −0.151 | −0.44117 | NMe2 | NMe2 | OMe | OMe | H | NMe2 | NMe2 |
| 63 | −0.146 | −0.444 | NMe2 | NMe2 | NHMe | OMe | H | NMe2 | NMe2 |
| 64 | −0.147 | −0.4395 | NMe2 | NMe2 | NMe2 | OMe | H | NMe2 | NMe2 |
| 65 | −0.166 | −0.66333 | NHMe | NHMe | OMe | OMe | H | NHMe | NHMe |
| 66 | −0.158 | −0.65683 | NHMe | NHMe | NHMe | OMe | H | NHMe | NHMe |
| 67 | −0.163 | −0.664 | NHMe | NHMe | NMe2 | OMe | H | NHMe | NHMe |
| 68 | −0.152 | −0.55083 | NMe2 | NHMe | OMe | OMe | H | NMe2 | NHMe |
| 69 | −0.148 | −0.55217 | NMe2 | NHMe | NHMe | OMe | H | NMe2 | NHMe |

| Phosphorus catalyst No. | $R^{13}$ | $R^{14}$ | $R^{15}$ | $R^{21}$ | $R^{22}$ | $R^{23}$ | $R^{24}$ | $R^{25}$ |
|---|---|---|---|---|---|---|---|---|
| 41 | OMe | OMe | H | OMe | H | OMe | OMe | H |
| 42 | NMe2 | OMe | H | NMe2 | H | NMe2 | OMe | H |
| 43 | NHMe | OMe | H | NHMe | H | NHMe | OMe | H |
| 44 | NMe2 | OMe | H | NHMe | H | NMe2 | OMe | H |
| 45 | NMe2 | OMe | H | OMe | H | NMe2 | OMe | H |
| 46 | NHMe | OMe | H | OMe | H | NHMe | OMe | H |
| 47 | OMe | NHMe | H | OMe | H | OMe | NHMe | H |
| 48 | NMe2 | NHMe | H | NMe2 | H | NMe2 | NHMe | H |
| 49 | NHMe | NHMe | H | NHMe | H | NHMe | NHMe | H |
| 50 | NMe2 | NHMe | H | NHMe | H | NMe2 | NHMe | H |
| 51 | NMe2 | NHMe | H | OMe | H | NMe2 | NHMe | H |
| 52 | NHMe | NHMe | H | OMe | H | NHMe | NHMe | H |
| 53 | OMe | NMe2 | H | OMe | H | OMe | NMe2 | H |
| 54 | NMe2 | NMe2 | H | NMe2 | H | NMe2 | NMe2 | H |
| 55 | NHMe | NMe2 | H | NHMe | H | NHMe | NMe2 | H |
| 56 | NMe2 | NMe2 | H | NHMe | H | NMe2 | NMe2 | H |
| 57 | NMe2 | NMe2 | H | OMe | H | NMe2 | NMe2 | H |
| 58 | NHMe | NMe2 | H | OMe | H | NHMe | NMe2 | H |

TABLE 17-continued

| | | | | | | | | |
|---|---|---|---|---|---|---|---|---|
| 59 | OMe | OMe | H | OMe | OMe | OMe | OMe | H |
| 60 | NHMe | OMe | H | OMe | OMe | NHMe | OMe | H |
| 61 | NMe2 | OMe | H | OMe | OMe | NMe2 | OMe | H |
| 62 | OMe | OMe | H | NMe2 | NMe2 | OMe | OMe | H |
| 63 | NHMe | OMe | H | NMe2 | NMe2 | NHMe | OMe | H |
| 64 | NMe2 | OMe | H | NMe2 | NMe2 | NMe2 | OMe | H |
| 65 | OMe | OMe | H | NHMe | NHMe | OMe | OMe | H |
| 66 | NHMe | OMe | H | NHMe | NHMe | NHMe | OMe | H |
| 67 | NMe2 | OMe | H | NHMe | NHMe | NMe2 | OMe | H |
| 68 | OMe | OMe | H | NMe2 | NHMe | OMe | OMe | H |
| 69 | NHMe | OMe | H | NMe2 | NHMe | NHMe | OMe | H |

TABLE 18

| Phosphorus catalyst No. | HOMO level | Average charge of ortho-position | $R^1$ | $R^2$ | $R^3$ | $R^4$ | $R^5$ | $R^{11}$ | $R^{12}$ |
|---|---|---|---|---|---|---|---|---|---|
| 70 | −0.149 | −0.55083 | NMe2 | NHMe | NMe2 | OMe | H | NMe2 | NHMe |
| 71 | −0.153 | −0.47867 | NMe2 | OMe | OMe | OMe | H | NMe2 | OMe |
| 72 | −0.151 | −0.48417 | NMe2 | OMe | NHMe | OMe | H | NMe2 | OMe |
| 73 | −0.149 | −0.47767 | NMe2 | OMe | NMe2 | OMe | H | NMe2 | OMe |
| 74 | −0.174 | −0.565 | NHMe | OMe | OMe | OMe | H | NHMe | OMe |
| 75 | −0.164 | −0.569 | NHMe | OMe | NHMe | OMe | H | NHMe | OMe |
| 76 | −0.163 | −0.56467 | NHMe | OMe | NMe2 | OMe | H | NHMe | OMe |
| 77 | −0.157 | −0.5085 | OMe | OMe | OMe | NHMe | H | OMe | OMe |
| 78 | −0.157 | −0.52233 | OMe | OMe | NHMe | NHMe | H | OMe | OMe |
| 79 | −0.155 | −0.6645 | NHMe | NHMe | OMe | NHMe | H | NHMe | NHMe |
| 80 | −0.151 | −0.664 | NHMe | NHMe | NHMe | NHMe | H | NHMe | NHMe |
| 81 | −0.151 | −0.67567 | NHMe | NHMe | NMe2 | NHMe | H | NHMe | NHMe |
| 82 | −0.153 | −0.4715 | NMe2 | OMe | OMe | NHMe | H | NMe2 | OMe |
| 83 | −0.153 | −0.4875 | NMe2 | OMe | NHMe | NHMe | H | NMe2 | OMe |
| 84 | −0.151 | −0.48433 | NMe2 | OMe | NMe2 | NHMe | H | NMe2 | OMe |
| 85 | −0.16 | −0.55533 | OMe | OMe | H | H | H | OMe | OMe |
| 86 | −0.167 | −0.481 | OMe | OMe | H | H | H | OMe | OMe |
| 87 | −0.169 | −0.52833 | OMe | OMe | H | H | H | OMe | OMe |
| 88 | −0.169 | −0.48917 | OMe | OMe | H | H | H | OMe | OMe |
| 89 | −0.171 | −0.51317 | OMe | OMe | H | H | H | OMe | OMe |
| 90 | −0.169 | −0.60417 | OMe | OMe | H | H | H | NHMe | NHMe |
| 91 | −0.163 | −0.58617 | NHMe | NHMe | H | H | H | NHMe | NHMe |
| 92 | −0.169 | −0.63183 | NHMe | NHMe | H | H | H | NHMe | NHMe |
| 93 | −0.169 | −0.6045 | NHMe | NHMe | H | H | H | NHMe | NHMe |
| 94 | −0.171 | −0.63017 | NHMe | NHMe | H | H | H | NHMe | NHMe |
| 95 | −0.162 | −0.46183 | OMe | OMe | H | H | H | NMe2 | NMe2 |
| 96 | −0.169 | −0.5135 | NHMe | NHMe | H | H | H | NMe2 | NMe2 |
| 97 | −0.162 | −0.4875 | OMe | NHMe | H | H | H | NMe2 | NMe2 |
| 98 | −0.161 | −0.45283 | OMe | NMe2 | H | H | H | NMe2 | NMe2 |

| Phosphorus catalyst No. | $R^{13}$ | $R^{14}$ | $R^{15}$ | $R^{21}$ | $R^{22}$ | $R^{23}$ | $R^{24}$ | $R^{25}$ |
|---|---|---|---|---|---|---|---|---|
| 70 | NMe2 | OMe | H | NMe2 | NHMe | NMe2 | OMe | H |
| 71 | OMe | OMe | H | NMe2 | OMe | OMe | OMe | H |
| 72 | NHMe | OMe | H | NMe2 | OMe | NHMe | OMe | H |
| 73 | NMe2 | OMe | H | NMe2 | OMe | NMe2 | OMe | H |
| 74 | OMe | OMe | H | NHMe | OMe | OMe | OMe | H |
| 75 | NHMe | OMe | H | NHMe | OMe | NHMe | OMe | H |
| 76 | NMe2 | OMe | H | NHMe | OMe | NMe2 | OMe | H |
| 77 | OMe | NHMe | H | OMe | OMe | OMe | NHMe | H |
| 78 | NHMe | NHMe | H | OMe | OMe | NHMe | NHMe | H |
| 79 | OMe | NHMe | H | NHMe | NHMe | OMe | NHMe | H |
| 80 | NHMe | NHMe | H | NHMe | NHMe | NHMe | NHMe | H |
| 81 | NMe2 | NHMe | H | NHMe | NHMe | NMe2 | NHMe | H |
| 82 | OMe | NHMe | H | NMe2 | OMe | OMe | NHMe | H |
| 83 | NHMe | NHMe | H | NMe2 | OMe | NHMe | NHMe | H |
| 84 | NMe2 | NHMe | H | NMe2 | OMe | NMe2 | NHMe | H |
| 85 | H | H | H | NHMe | NHMe | H | H | H |
| 86 | H | H | H | NMe2 | NMe2 | H | H | H |
| 87 | H | H | H | OMe | NHMe | H | H | H |
| 88 | H | H | H | OMe | NMe2 | H | H | H |
| 89 | H | H | H | NHMe | NMe2 | H | H | H |
| 90 | H | H | H | NHMe | NHMe | H | H | H |
| 91 | H | H | H | NMe2 | NMe2 | H | H | H |
| 92 | H | H | H | OMe | NHMe | H | H | H |
| 93 | H | H | H | OMe | NMe2 | H | H | H |
| 94 | H | H | H | NHMe | NMe2 | H | H | H |

TABLE 18-continued

| | | | | | | | | |
|---|---|---|---|---|---|---|---|---|
| 95 | H | H | H | NMe2 | NMe2 | H | H | H |
| 96 | H | H | H | NMe2 | NMe2 | H | H | H |
| 97 | H | H | H | NMe2 | NMe2 | H | H | H |
| 98 | H | H | H | NMe2 | NMe2 | H | H | H |

TABLE 19

| Phosphorus catalyst No. | HOMO level | Average charge of ortho-position | R¹ | R² | R³ | R⁴ | R⁵ | R¹¹ | R¹² | R¹³ | R¹⁴ | R¹⁵ | R²¹ | R²² | R²³ | R²⁴ | R²⁵ |
|---|---|---|---|---|---|---|---|---|---|---|---|---|---|---|---|---|---|
| 99 | −0.163 | −0.47417 | NHMe | NMe2 | H | H | H | NMe2 | NMe2 | H | H | H | NMe2 | NMe2 | H | H | H |
| 100 | −0.169 | −0.55117 | OMe | OMe | H | H | H | OMe | NHMe | H | H | H | OMe | NHMe | H | H | H |
| 101 | −0.17 | −0.62067 | OMe | NHMe | H | H | H | OMe | NHMe | H | H | H | NHMe | NHMe | H | H | H |
| 102 | −0.171 | −0.5365 | OMe | NHMe | H | H | H | OMe | NHMe | H | H | H | NMe2 | NMe2 | H | H | H |
| 103 | −0.171 | −0.54717 | OMe | NHMe | H | H | H | OMe | NHMe | H | H | H | OMe | NMe2 | H | H | H |
| 104 | −0.174 | −0.56883 | OMe | NHMe | H | H | H | OMe | NHMe | H | H | H | NHMe | NMe2 | H | H | H |
| 105 | −0.166 | −0.4795 | OMe | OMe | H | H | H | OMe | NMe2 | H | H | H | OMe | NMe2 | H | H | H |
| 106 | −0.162 | −0.54217 | OMe | NMe2 | H | H | H | OMe | NMe2 | H | H | H | NHMe | NHMe | H | H | H |
| 107 | −0.166 | −0.4625 | OMe | NMe2 | H | H | H | OMe | NMe2 | H | H | H | NMe2 | NMe2 | H | H | H |
| 108 | −0.17 | −0.50483 | OMe | NHMe | H | H | H | OMe | NMe2 | H | H | H | OMe | NMe2 | H | H | H |
| 109 | −0.17 | −0.496 | OMe | NMe2 | H | H | H | OMe | NMe2 | H | H | H | NHMe | NMe2 | H | H | H |
| 110 | −0.17 | −0.5275 | OMe | OMe | H | H | H | NHMe | NMe2 | H | H | H | NHMe | NMe2 | H | H | H |
| 111 | −0.168 | −0.58483 | NHMe | NHMe | H | H | H | NHMe | NMe2 | H | H | H | NHMe | NMe2 | H | H | H |
| 112 | −0.167 | −0.5105 | NHMe | NMe2 | H | H | H | NHMe | NMe2 | H | H | H | NMe2 | NMe2 | H | H | H |
| 113 | −0.171 | −0.55933 | OMe | NHMe | H | H | H | NHMe | NMe2 | H | H | H | NHMe | NMe2 | H | H | H |
| 114 | −0.169 | −0.52 | OMe | NMe2 | H | H | H | NHMe | NMe2 | H | H | H | NHMe | NMe2 | H | H | H |
| 115 | −0.166 | −0.5255 | OMe | OMe | H | H | H | NHMe | NHMe | H | H | H | NMe2 | NMe2 | H | H | H |
| 116 | −0.163 | −0.57233 | OMe | OMe | H | H | H | OMe | NHMe | H | H | H | NHMe | NHMe | H | H | H |
| 117 | −0.162 | −0.53917 | OMe | OMe | H | H | H | OMe | NHMe | H | H | H | NHMe | NHMe | H | H | H |
| 118 | −0.171 | −0.58567 | OMe | OMe | H | H | H | NHMe | NHMe | H | H | H | NHMe | NHMe | H | H | H |
| 119 | −0.163 | −0.505 | OMe | OMe | H | H | H | OMe | NHMe | H | H | H | NMe2 | NMe2 | H | H | H |
| 120 | −0.164 | −0.47267 | OMe | OMe | H | H | H | OMe | NMe2 | H | H | H | NMe2 | NMe2 | H | H | H |
| 121 | −0.165 | −0.4895 | OMe | OMe | H | H | H | NHMe | NMe2 | H | H | H | NMe2 | NMe2 | H | H | H |
| 122 | −0.167 | −0.51017 | OMe | OMe | H | H | H | OMe | NHMe | H | H | H | OMe | NMe2 | H | H | H |
| 123 | −0.17 | −0.52467 | OMe | OMe | H | H | H | OMe | NHMe | H | H | H | NHMe | NMe2 | H | H | H |
| 124 | −0.166 | −0.50817 | OMe | OMe | H | H | H | OMe | NMe2 | H | H | H | NHMe | NMe2 | H | H | H |
| 125 | −0.164 | −0.54917 | OMe | NHMe | H | H | H | NHMe | NHMe | H | H | H | NMe2 | NMe2 | H | H | H |
| 126 | −0.166 | −0.514 | OMe | NMe2 | H | H | H | NHMe | NHMe | H | H | H | NMe2 | NMe2 | H | H | H |
| 127 | −0.164 | −0.53417 | NHMe | NHMe | H | H | H | NHMe | NMe2 | H | H | H | NMe2 | NMe2 | H | H | H |

TABLE 20

| Phosphorus catalyst No. | HOMO level | Average charge of ortho-position | R¹ | R² | R³ | R⁴ | R⁵ | R¹¹ | R¹² | R¹³ | R¹⁴ | R¹⁵ | R²¹ | R²² | R²³ | R²⁴ | R²⁵ |
|---|---|---|---|---|---|---|---|---|---|---|---|---|---|---|---|---|---|
| 128 | −0.164 | −0.48933 | OMe | NHMe | H | H | H | OMe | NMe2 | H | H | H | NMe2 | NMe2 | H | H | H |
| 129 | −0.165 | −0.52233 | OMe | NHMe | H | H | H | NHMe | NMe2 | H | H | H | NMe2 | NMe2 | H | H | H |
| 130 | −0.172 | −0.5225 | OMe | NHMe | H | H | H | OMe | NMe2 | H | H | H | NHMe | NMe2 | H | H | H |
| 131 | −0.184 | −0.2115 | OMe | H | OMe | H | H | OMe | H | OMe | H | H | NHMe | H | NHMe | H | H |
| 132 | −0.185 | −0.1785 | OMe | H | OMe | H | H | OMe | H | OMe | H | H | NMe2 | H | NMe2 | H | H |
| 133 | −0.193 | −0.1905 | OMe | H | OMe | H | H | OMe | H | OMe | H | H | OMe | H | NHMe | H | H |
| 134 | −0.195 | −0.19083 | OMe | H | OMe | H | H | OMe | H | OMe | H | H | OMe | H | NMe2 | H | H |
| 135 | −0.192 | −0.175 | OMe | H | OMe | H | H | OMe | H | OMe | H | H | NMe2 | H | OMe | H | H |
| 136 | −0.184 | −0.20967 | OMe | H | OMe | H | H | OMe | H | OMe | H | H | NHMe | H | OMe | H | H |
| 137 | −0.184 | −0.21083 | OMe | H | OMe | H | H | OMe | H | OMe | H | H | NHMe | H | NMe2 | H | H |
| 138 | −0.182 | −0.186 | OMe | H | OMe | H | H | OMe | H | OMe | H | H | NMe2 | H | NHMe | H | H |
| 139 | −0.171 | −0.23017 | OMe | H | OMe | H | H | NHMe | H | NHMe | H | H | NHMe | H | NHMe | H | H |
| 140 | −0.172 | −0.21783 | NHMe | H | NHMe | H | H | NHMe | H | NHMe | H | H | NMe2 | H | NMe2 | H | H |
| 141 | −0.174 | −0.237 | OMe | H | NMe2 | H | H | NHMe | H | NHMe | H | H | NHMe | H | NHMe | H | H |
| 142 | −0.172 | −0.23283 | OMe | H | NMe2 | H | H | NHMe | H | NHMe | H | H | NHMe | H | NHMe | H | H |
| 143 | −0.169 | −0.21933 | NMe2 | H | OMe | H | H | NHMe | H | NHMe | H | H | NHMe | H | NHMe | H | H |
| 144 | −0.173 | −0.25233 | NHMe | H | OMe | H | H | NHMe | H | NHMe | H | H | NHMe | H | NHMe | H | H |
| 145 | −0.169 | −0.25317 | NHMe | H | NHMe | H | H | NHMe | H | NHMe | H | H | NHMe | H | NMe2 | H | H |
| 146 | −0.176 | −0.222 | NHMe | H | NHMe | H | H | NHMe | H | NHMe | H | H | NHMe | H | NHMe | H | H |
| 147 | −0.174 | −0.16667 | OMe | H | OMe | H | H | NMe2 | H | NMe2 | H | H | NMe2 | H | NMe2 | H | H |
| 148 | −0.179 | −0.18917 | NHMe | H | NHMe | H | H | NMe2 | H | NMe2 | H | H | NMe2 | H | NMe2 | H | H |
| 149 | −0.175 | −0.17 | OMe | H | NHMe | H | H | NMe2 | H | NMe2 | H | H | NMe2 | H | NMe2 | H | H |
| 150 | −0.175 | −0.168 | OMe | H | NMe2 | H | H | NMe2 | H | NMe2 | H | H | NMe2 | H | NMe2 | H | H |
| 151 | −0.175 | −0.15033 | NMe2 | H | OMe | H | H | NMe2 | H | NMe2 | H | H | NMe2 | H | NMe2 | H | H |
| 152 | −0.172 | −0.18033 | NHMe | H | OMe | H | H | NMe2 | H | NMe2 | H | H | NMe2 | H | NMe2 | H | H |
| 153 | −0.175 | −0.18667 | NHMe | H | NMe2 | H | H | NMe2 | H | NMe2 | H | H | NMe2 | H | NMe2 | H | H |

TABLE 20-continued

| Phosphorus catalyst No. | HOMO level | Average charge of ortho-position | $R^1$ | $R^2$ | $R^3$ | $R^4$ | $R^5$ | $R^{11}$ | $R^{12}$ | $R^{13}$ | $R^{14}$ | $R^{15}$ | $R^{21}$ | $R^{22}$ | $R^{23}$ | $R^{24}$ | $R^{25}$ |
|---|---|---|---|---|---|---|---|---|---|---|---|---|---|---|---|---|---|
| 154 | −0.177 | −0.158 | NMe2 | H | NHMe | H | H | NMe2 | H | NMe2 | H | H | NMe2 | H | NMe2 | H | H |
| 155 | −0.184 | −0.19283 | OMe | H | OMe | H | H | OMe | H | NHMe | H | H | OMe | H | NHMe | H | H |
| 156 | −0.177 | −0.2245 | OMe | H | NHMe | H | H | OMe | H | NHMe | H | H | NHMe | H | NHMe | H | H |

TABLE 21

| Phosphorus catalyst No. | HOMO level | Average charge of ortho-position | $R^1$ | $R^2$ | $R^3$ | $R^4$ | $R^5$ | $R^{11}$ | $R^{12}$ | $R^{13}$ | $R^{14}$ | $R^{15}$ | $R^{21}$ | $R^{22}$ | $R^{23}$ | $R^{24}$ | $R^{25}$ |
|---|---|---|---|---|---|---|---|---|---|---|---|---|---|---|---|---|---|
| 157 | −0.182 | −0.17917 | OMe | H | NHMe | H | H | OMe | H | NHMe | H | H | NMe2 | H | NMe2 | H | H |
| 158 | −0.187 | −0.19567 | OMe | H | NHMe | H | H | OMe | H | NHMe | H | H | OMe | H | NMe2 | H | H |
| 159 | −0.183 | −0.17933 | OMe | H | NHMe | H | H | OMe | H | NHMe | H | H | NMe2 | H | OMe | H | H |
| 160 | −0.181 | −0.21233 | OMe | H | NHMe | H | H | OMe | H | NHMe | H | H | NHMe | H | OMe | H | H |
| 161 | −0.179 | −0.213 | OMe | H | NHMe | H | H | OMe | H | NHMe | H | H | NHMe | H | NMe2 | H | H |
| 162 | −0.18 | −0.18733 | OMe | H | NHMe | H | H | OMe | H | NHMe | H | H | NMe2 | H | NHMe | H | H |
| 163 | −0.187 | −0.19017 | OMe | H | OMe | H | H | OMe | H | NMe2 | H | H | OMe | H | NMe2 | H | H |
| 164 | −0.18 | −0.21067 | OMe | H | NMe2 | H | H | OMe | H | NMe2 | H | H | NHMe | H | NHMe | H | H |
| 165 | −0.178 | −0.18183 | OMe | H | NMe2 | H | H | OMe | H | NMe2 | H | H | NMe2 | H | NMe2 | H | H |
| 166 | −0.186 | −0.193 | OMe | H | NMe2 | H | H | OMe | H | NMe2 | H | H | OMe | H | NHMe | H | H |
| 167 | −0.182 | −0.17917 | OMe | H | NMe2 | H | H | OMe | H | NMe2 | H | H | NMe2 | H | OMe | H | H |
| 168 | −0.18 | −0.2185 | OMe | H | NMe2 | H | H | OMe | H | NMe2 | H | H | NHMe | H | OMe | H | H |
| 169 | −0.178 | −0.21317 | OMe | H | NMe2 | H | H | OMe | H | NMe2 | H | H | NHMe | H | NMe2 | H | H |
| 170 | −0.18 | −0.1875 | OMe | H | NMe2 | H | H | OMe | H | NMe2 | H | H | NMe2 | H | NHMe | H | H |

It is thought that the above results reveal that, in a similar manner to the phosphorus catalysts Nos. 9 to 11 used in the above Examples 1 to 40, the phosphorus catalysts Nos. 12 to 170 can also be used favorably as catalysts for the polyisocyanurate production reaction.

[Evaluation of Adhesives using Polyisocyanurate Raw Material Compositions]

(Adhesives 1 to 4)

The polyisocyanurate raw material compositions of Examples 17, 18, 39 and 40 were used as adhesives 1 to 4 respectively, and an evaluation of the tensile shear adhesive strength was conducted in the manner described below. The results are shown in Table 22.

<Evaluation of Tensile Shear Adhesive Strength>

A test piece was prepared and the tensile shear adhesive strength was measured in accordance with JIS K6850 (Testing Methods for Tensile Shear Strength of Adhesive-Rigid Adherends).

(1) Pretreatment of Adherend

A 1.6×25×100 mm sheet of carbon steel (S45C-P, manufactured by Nippon Test Panel Co., Ltd.) was used as the adherend. The carbon steel sheet that was used was subjected to an acetone degreasing treatment in accordance with JIS K6848-2.

(2) Production of Test Piece

Each of the adhesives 1 to 4 was applied to a carbon steel sheet, two carbon steel sheets were bonded together with an overlap length of 12.5 mm, and excess exuded adhesive was wiped away. The overlapped two carbon steel sheets were heated at 100° C. for 180 minutes, and then at 200° C. for 60 minutes, using a convection drying oven (VTR-111, manufactured by Isuzu Seisakusho Co., Ltd.), thus completing production of a test piece.

(3) Measurement of Tensile Shear Adhesive Strength

Using a universal material tester (Instron 5900R, manufactured by Instron Japan Co., Ltd.), the adhesive strength of the above test piece was measured at a test speed of 3 mm/minute. Measurements were conducted using n=5, and the average value was recorded as the tensile shear adhesive strength. The results are shown in Table 22.

TABLE 22

|  | Adhesive 1 | Adhesive 2 | Adhesive 3 | Adhesive 4 |
|---|---|---|---|---|
| Polyisocyanurate raw material composition | Example 17 | Example 18 | Example 39 | Example 40 |
| Tensile shear adhesive strength [MPa] | 19.4 | 18.0 | 14.7 | 14.2 |

In terms of the tensile shear adhesive strength, each of the adhesives 1 to 4 exhibited an adhesive strength of at least 10 MPa. These results confirmed that adhesives using the polyisocyanurate raw material composition have excellent adhesiveness.

INDUSTRIAL APPLICABILITY

The present invention provides a method for producing a polyisocyanurate that exhibits little foaming during heat curing and has favorable curability, as well as a polyisocyanurate raw material composition and a polyisocyanurate production kit that can be used in the production method. Further, the invention also provides a polyisocyanurate or polyisocyanurate composition having little foaming produced by the above production method. The polyisocyanurate or polyisocyanurate raw material cured product can be used in various applications, including coating materials, adhesives, sealants and various molded items.

The invention claimed is:

1. A polyisocyanurate raw material composition comprising a polyfunctional isocyanate, a compound (I) represented by general formula (I) shown below, and an epoxy compound:

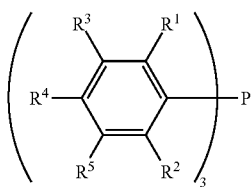

wherein in general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

2. A polyisocyanurate raw material composition comprising a polyfunctional isocyanate, and a compound (I) represented by general formula (I) shown below:

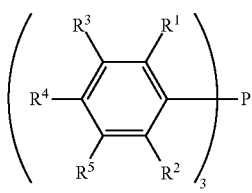

wherein in general formula (I), each of $R^1$ and $R^2$ independently represents a hydrogen atom, an alkoxy group of 1 to 12 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

3. The polyisocyanurate raw material composition according to claim 1, wherein a ratio (molar ratio) between the polyfunctional isocyanate and the compound (I) is represented by: polyfunctional isocyanate/compound (I)=100/0.001 to 100/5.

4. The polyisocyanurate raw material composition according to claim 1, wherein the polyfunctional isocyanate is at least one compound selected from the group consisting of diphenylmethane diisocyanate, tolylene diisocyanate, hexamethylene diisocyanate, and bis(isocyanatomethyl)cyclohexane.

5. The polyisocyanurate raw material composition according to claim 1, wherein each of $R^1$ and $R^2$ in the general formula (I) independently represents a hydrogen atom or an alkoxy group of 1 to 4 carbon atoms, provided that $R^1$ and $R^2$ that belong to the same group among the three groups bonded to the phosphorus atom in general formula (I) are not both hydrogen atoms.

6. A polyisocyanurate production kit comprising: (a) a polyfunctional isocyanate, (b) a compound represented by general formula (I) shown below, and (c) an epoxy compound, wherein the components (a) to (c) are each housed in a different container:

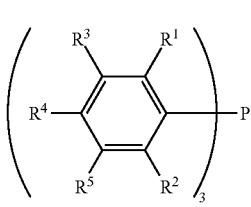

wherein in general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

7. A polyisocyanurate production kit comprising: (d) a composition comprising a polyfunctional isocyanate and a compound (I) represented by general formula (I) shown below, and (c) an epoxy compound, wherein the components (d) and (c) are each housed in a different container:

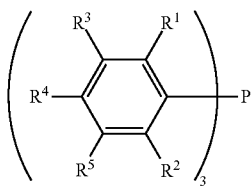

(I)

wherein in general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

8. A polyisocyanurate production kit comprising: (d) a composition comprising a polyfunctional isocyanate and a compound (I) represented by general formula (I) shown below, and (e) a composition comprising a polyfunctional isocyanate and an epoxy compound, wherein the components (d) and (e) are each housed in a different container:

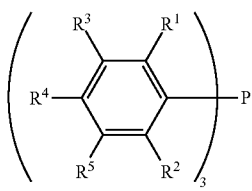

(I)

wherein in general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

9. A polyisocyanurate production kit comprising: (e) a composition comprising a polyfunctional isocyanate and an epoxy compound, and (b) a compound (I) represented by general formula (I) shown below, wherein the components (e) and (b) are each housed in a different container:

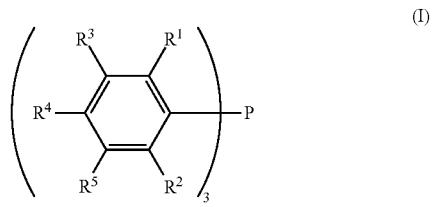

(I)

wherein in general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

10. A polyisocyanurate raw material cured product obtained by heating the polyisocyanurate raw material composition according to claim 1.

11. A polyisocyanurate raw material cured product comprising:
   a polyisocyanurate, and
   at least one compound selected from the group consisting of a compound (I) represented by general formula (I) shown below and a compound (I') represented by general formula (I') shown below:

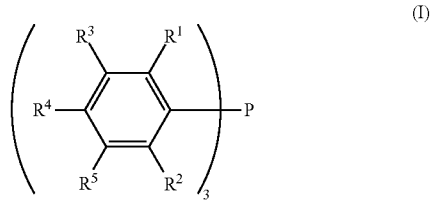

(I)

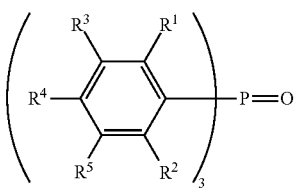

wherein in general formulas (I) and (I'), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formulas (I) and (I') are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

12. A method for producing a polyisocyanurate, comprising mixing a polyfunctional isocyanate, a compound (I) represented by general formula (I) shown below and an epoxy compound, and heating the mixture obtained by the mixing:

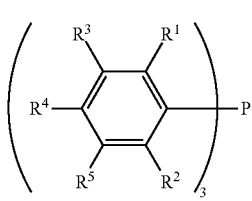

wherein in general formula (I), each of $R^1$ and $R^2$ independently represents a hydrogen atom, an alkoxy group of 1 to 10 carbon atoms, an alkyl group of 2 to 10 carbon atoms, an aryl group of 6 to 12 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom, provided that $R^1$ and $R^2$ that belong to the same group among the three groups bonded to the phosphorus atom in general formula (I) are not both hydrogen atoms; each of $R^3$ to $R^5$ independently represents a hydrogen atom, an alkyl group of 1 to 10 carbon atoms, an aryl group of 6 to 12 carbon atoms, an alkoxy group of 1 to 10 carbon atoms, an amino group, a monoalkylamino group of 1 to 10 carbon atoms, a dialkylamino group of 2 to 20 carbon atoms, a carboxy group, a cyano group, a fluoroalkyl group of 1 to 10 carbon atoms, or a halogen atom; and the three $R^1$ may be identical or different; the three $R^2$ may be identical or different; the three $R^3$ may be identical or different; the three $R^4$ may be identical or different; and the three $R^5$ may be identical or different.

13. The method for producing a polyisocyanurate according to claim 12, wherein the mixing step is a step of mixing the epoxy compound into a mixture (d) of the polyfunctional isocyanate and the compound (I).

14. The method for producing a polyisocyanurate according to claim 12, wherein the mixing step is a step of mixing the compound (I) into a mixture (e) of the polyfunctional isocyanate and the epoxy compound.

15. The method for producing a polyisocyanurate according to claim 12, wherein the heating step is conducted at a temperature of 40 to 240° C.

16. The method for producing a polyisocyanurate according to claim 15, wherein the heating step is a step of conducting heating at 60 to 120° C. for 1 to 180 minutes, and then conducting heating at 120 to 240° C. for 1 to 180 minutes.

17. An adhesive formed from the polyisocyanurate raw material composition according to claim 1.

* * * * *